United States Patent
Zhu et al.

(10) Patent No.: US 12,089,291 B2
(45) Date of Patent: Sep. 10, 2024

(54) MACHINE LEARNING MODEL CONFIGURATION IN WIRELESS NETWORKS

(71) Applicant: QUALCOMM Incorporated, San Diego, CA (US)

(72) Inventors: Xipeng Zhu, San Diego, CA (US); Gavin Bernard Horn, La Jolla, CA (US); Taesang Yoo, San Diego, CA (US); Rajeev Kumar, San Diego, CA (US); Shankar Krishnan, San Diego, CA (US); Aziz Gholmieh, Del Mar, CA (US); Rajat Prakash, San Diego, CA (US); Eren Balevi, San Diego, CA (US)

(*) Notice: Subject to any disclaimer, the term of this patent is extended or adjusted under 35 U.S.C. 154(b) by 386 days.

(21) Appl. No.: 17/348,522

(22) Filed: Jun. 15, 2021

(65) Prior Publication Data

US 2022/0400373 A1 Dec. 15, 2022

(51) Int. Cl.
*H04W 8/24* (2009.01)
*G06N 3/04* (2023.01)
*G06N 3/08* (2023.01)

(52) U.S. Cl.
CPC ............... *H04W 8/24* (2013.01); *G06N 3/04* (2013.01); *G06N 3/08* (2013.01)

(58) Field of Classification Search
CPC .............. H04W 8/24; G06N 3/04; G06N 3/08
USPC ........................................................ 370/328
See application file for complete search history.

(56) References Cited

U.S. PATENT DOCUMENTS

| | | | |
|---|---|---|---|
| 2020/0174559 A1* | 6/2020 | Scott, II | G06F 1/1694 |
| 2020/0174707 A1* | 6/2020 | Johnson | G06F 12/0207 |
| 2021/0158151 A1* | 5/2021 | Wang | H04L 12/189 |
| 2021/0160149 A1 | 5/2021 | Ma et al. | |

FOREIGN PATENT DOCUMENTS

WO 2021063500 A1 4/2021

OTHER PUBLICATIONS

Application of Machine Learning in Wireless Networks, 34 pages (Year: 2019).*
International Search Report and Written Opinion—PCT/US2022/072800—ISA/EPO—Sep. 22, 2022.
Nguyen D.C., et al., "Wireless AI: Enabling an AI-Governed Data Life Cycle", arxiv.org, Cornell University Library, 201 Olin Library Cornell University Ithaca, NY 14853, Feb. 25, 2020 (Feb. 25, 2020), XP081611186, 41 Pages, Chapter "V. Access AI" on pp. 15-16 Chapter "VI. User Device AI" and Table V on pp. 23-27 figure 9.

* cited by examiner

*Primary Examiner* — Christopher M Crutchfield
*Assistant Examiner* — Jean F Voltaire

(57) ABSTRACT

Certain aspects of the present disclosure provide techniques and apparatus for determining neural network functions (NNFs) and configuring and using corresponding machine learning (ML) models for performing one or more ML-based wireless communications management procedures. An example method performed by a user equipment includes transmitting, to a base station (BS), UE capability information indicating at least one radio capability of the UE and at least one machine learning (ML) capability of the UE and receiving, from the BS based on the UE capability information, ML configuration information indicating at least one neural network function (NNF) and at least one ML model corresponding to the at least one NNF.

29 Claims, 10 Drawing Sheets

MACHINE LEARNING MODEL CONFIGURATION IN WIRELESS NETWORKS

INTRODUCTION

Aspects of the present disclosure relate to wireless communications, and more particularly, to techniques for configuring the use of a machine learning model in a wireless communication network.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by at least one of a base station (BS) or other network entity. The method generally includes receiving, from a user equipment (UE), UE capability information indicating at least one radio capability of the UE and at least one machine learning (ML) capability of the UE and transmitting, to the UE based on the UE capability information, ML configuration information indicating at least one neural network function (NNF) and at least one ML model corresponding to the at least one NNF.

Certain aspects can be implemented in an apparatus for wireless communication. The apparatus generally includes a memory comprising computer-executable instructions and one or more processors configured to execute the computer-executable instructions and cause the apparatus to: receive, from a user equipment (UE), UE capability information indicating at least one radio capability of the UE and at least one machine learning (ML) capability of the UE and transmit, to the UE based on the UE capability information, ML configuration information indicating at least one neural network function (NNF) and at least one ML model corresponding to the at least one NNF.

Certain aspects can be implemented in an apparatus for wireless communication. The apparatus may include means for receiving, from a user equipment (UE), UE capability information indicating at least one radio capability of the UE and at least one machine learning (ML) capability of the UE and means for transmitting, to the UE based on the UE capability information, ML configuration information indicating at least one neural network function (NNF) and at least one ML model corresponding to the at least one NNF.

Certain aspects can be implemented in a non-transitory computer-readable medium. The non-transitory computer-readable medium may comprise computer-executable instructions that, when executed by one or more processors of an apparatus, cause the apparatus to: receive, from a user equipment (UE), UE capability information indicating at least one radio capability of the UE and at least one machine learning (ML) capability of the UE and transmit, to the UE based on the UE capability information, ML configuration information indicating at least one neural network function (NNF) and at least one ML model corresponding to the at least one NNF.

Certain aspects can be implemented in a computer program product embodied on a computer-readable storage medium. The computer-readable storage medium may comprise code for performing wireless communication by a base station (BS) or other network entity including code for: receiving, from a user equipment (UE), UE capability information indicating at least one radio capability of the UE and at least one machine learning (ML) capability of the UE and transmitting, to the UE based on the UE capability information, ML configuration information indicating at least one neural network function (NNF) and at least one ML model corresponding to the at least one NNF.

Certain aspects can be implemented in a method for wireless communication performed by a user equipment (UE). The method generally includes transmitting, to a base station (BS) or other network entity, UE capability information indicating at least one radio capability of the UE and at least one machine learning (ML) capability of the UE and receiving, from the BS or other network entity based on the UE capability information, ML configuration information indicating at least one neural network function (NNF) and at least one ML model corresponding to the at least one NNF.

Certain aspects can be implemented in an apparatus for wireless communication. The apparatus generally includes a memory comprising computer-executable instructions and one or more processors configured to execute the computer-executable instructions and cause the apparatus to transmit, to a base station (BS) or other network entity, capability information indicating at least one radio capability of the apparatus and at least one machine learning (ML) capability of the apparatus and to receive, from the BS or other network entity based on the capability information, ML configuration information indicating at least one neural network function (NNF) and at least one ML model corresponding to the at least one NNF.

Certain aspects can be implemented in an apparatus for wireless communication. The apparatus may include means for transmitting, to a base station (BS) or other network entity, capability information indicating at least one radio capability of the apparatus and at least one machine learning (ML) capability of the apparatus and means for receiving, from the BS or other network entity based on the capability information, ML configuration information indicating at least one neural network function (NNF) and at least one ML model corresponding to the at least one NNF.

Certain aspects can be implemented in a non-transitory computer-readable medium. The non-transitory computer-readable medium may comprise computer-executable instructions that, when executed by one or more processors of an apparatus, cause the apparatus to: transmit, to a base station (BS) or other network entity, capability information indicating at least one radio capability of the apparatus and at least one machine learning (ML) capability of the apparatus and receiving, from the BS or other network entity based on the capability information, ML configuration information indicating at least one neural network function (NNF) and at least one ML model corresponding to the at least one NNF.

Certain aspects can be implemented in a computer program product embodied on a computer-readable storage medium. The computer-readable storage medium may comprise code for transmitting, to a base station (BS) or other network entity, capability information indicating at least one radio capability of a user equipment (UE) and at least one machine learning (ML) capability of the UE and for receiving, from the BS or other network entity based on the UE capability information, ML configuration information indicating at least one neural network function (NNF) and at least one ML model corresponding to the at least one NNF.

Certain aspects can be implemented in a method for wireless communication performed by a first network entity. The method generally includes receiving, from a second network entity, a first signal including a first indication of at least one machine learning (ML) capability of a user equipment (UE) and a second indication of at least one neural network function (NNF) corresponding to an ML-based wireless communications management procedure associated with the UE; selecting at least one ML model for performing at least a portion of the ML-based wireless communications management procedure based, at least in part, on the at least one ML capability of the UE; and transmitting a second signal, to the second network entity, including ML configuration information indicating the at least one NNF and the at least one ML model.

Certain aspects can be implemented in an apparatus for wireless communication. The apparatus generally includes a memory comprising computer-executable instructions and one or more processors configured to execute the computer-executable instructions and cause the apparatus to receive, from a network entity, a first signal including a first indication of at least one machine learning (ML) capability of a user equipment (UE) and a second indication of at least one neural network function (NNF) corresponding to an ML-based wireless communications management procedure associated with the UE; to select at least one ML model for performing at least a portion of the ML-based wireless communications management procedure based, at least in part, on the at least one ML capability of the UE; and to transmit a second signal, to the network entity, including ML configuration information indicating the at least one NNF and the at least one ML model.

Certain aspects can be implemented in an apparatus for wireless communication. The apparatus may include means for receiving, from a network entity, a first signal including a first indication of at least one machine learning (ML) capability of a user equipment (UE) and a second indication of at least one neural network function (NNF) corresponding to an ML-based wireless communications management procedure associated with the UE; means for selecting at least one ML model for performing at least a portion of the ML-based wireless communications management procedure based, at least in part, on the at least one ML capability of the UE; and means for transmitting a second signal, to the network entity, including ML configuration information indicating the at least one NNF and the at least one ML model.

Certain aspects can be implemented in a non-transitory computer-readable medium for wireless communication. The non-transitory computer-readable medium may comprise computer-executable instructions that, when executed by one or more processors of an apparatus, cause the apparatus to: receive, from a network entity, a first signal including a first indication of at least one machine learning (ML) capability of a user equipment (UE) and a second indication of at least one neural network function (NNF) corresponding to an ML-based wireless communications management procedure associated with the UE; select at least one ML model for performing at least a portion of the ML-based wireless communications management procedure based, at least in part, on the at least one ML capability of the UE; and transmit a second signal, to the network entity, including ML configuration information indicating the at least one NNF and the at least one ML model.

Certain aspects can be implemented in a computer program product embodied on a computer-readable medium. The computer-readable medium may comprise code for receiving, from a network entity, a first signal including a first indication of at least one machine learning (ML) capability of a user equipment (UE) and a second indication of at least one neural network function (NNF) corresponding to an ML-based wireless communications management procedure associated with the UE; code for selecting at least one ML model for performing at least a portion of the ML-based wireless communications management procedure based, at least in part, on the at least one ML capability of the UE; and code for transmitting a second signal, to the network entity, including ML configuration information indicating the at least one NNF and the at least one ML model.

Other aspects provide: an apparatus operable, configured, or otherwise adapted to perform the aforementioned methods as well as those described elsewhere herein; a non-transitory, computer-readable medium comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable media for executing neural network functions (NNFs) by configuring and using corresponding machine learning (ML) models to perform one or more ML-based wireless communications management procedures.

For example, machine learning may be used by a wireless communications device to generate a predictive ML model, which may, in turn, be used to form inferences about input data. In some cases, one or more ML models may be used to execute an NNF for performing one or more ML-based wireless communications management procedures. In some cases, it may be advantageous for a base station of a wireless communication network to dynamically configure a UE with at least one NNF and/or one or more corresponding ML models. This dynamic configuration may provide flexibility within the wireless communication network. For example, this dynamic configuration may allow the UE to not have to store all possible ML models for a particular NNF, saving storage space on the UE. Instead, the UE may separately download a particular ML model (e.g., model structure and/or model parameters) when indicated to use that particular ML model. Additionally, dynamic configuration may provide the base station with flexibility to selectively choose, at any given time and for a particular scenario, which NNF(s) and/or corresponding model(s) to use for performing one or more ML-based wireless communications management procedures. Moreover, dynamic configuration may allow the base station to dynamically update ML models for NNFs.

However, there currently does not exist a way for a base station to configure a UE to use a particular NNF and/or ML model (e.g., to perform certain ML-based wireless communications management procedures). Thus, aspects of the present disclosure provide techniques to facilitate the configuration and use of NNFs and corresponding ML models within a wireless communication network.

Introduction to Wireless Communication Networks

Figure 1:
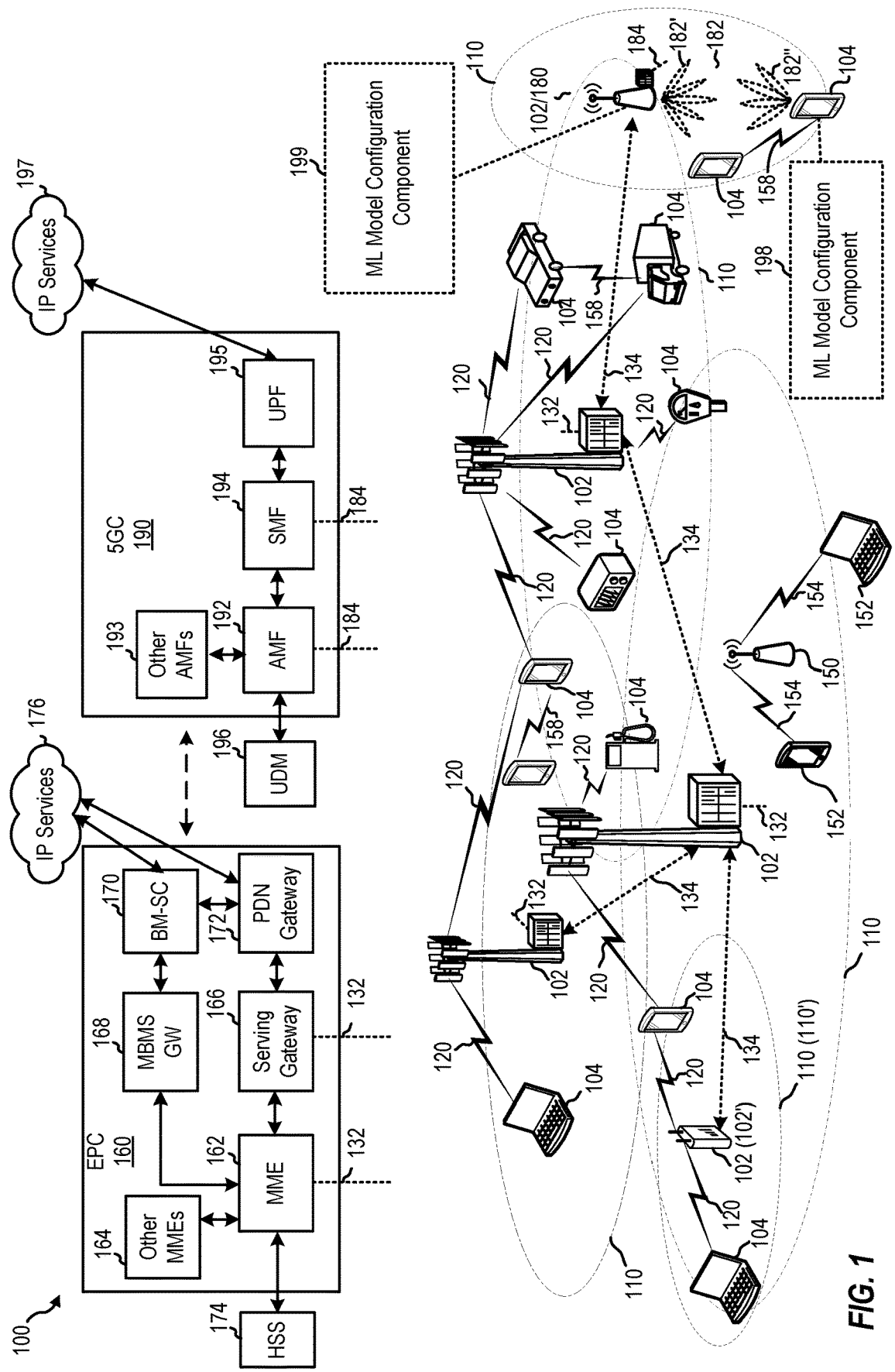
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and fifth generation (5G) Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages, among other functions. Base stations may include and/or be referred to as a NodeB, evolved NodeB (eNB), next generation NodeB (gNB), next generation eNB (ng-eNB) (e.g., an eNB that has been enhanced to provide connection to both EPC 160 and 5GC 190), an access point, a base transceiver station, a radio base station, a radio transceiver, a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps a portion of the coverage area 110 of one or more macrocells (e.g., high-power base stations).

The communication links 120 between base stations 102 and UEs 104 may include uplink (UL) (also referred to as "reverse link") transmissions from a user equipment 104 to a base station 102 and/or downlink (DL) (also referred to as "forward link") transmissions from a base station 102 to a user equipment 104. The communication links 120 may use multiple-input, multiple-output (MIMO) antenna technology, including spatial multiplexing, beamforming, and/or transmit diversity in various aspects.

Examples of UEs 104 include a cellular phone, a smartphone, a session initiation protocol (SIP) phone, a laptop, a personal digital assistant (PDA), a satellite radio, a global positioning system (GPS) device, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other wireless devices. Some of the UEs 104 may be Internet of things (IoT) devices (e.g., parking meter, gas pump, toaster, vehicles, heart monitor, or other IoT devices), always on (AON) devices, or edge processing devices. A UE 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., base station 180 in FIG. 1) may utilize beamforming 182 with a UE 104 to improve path loss and range. For example, base station 180 and UE 104 may each include a plurality of antennas, such as antenna elements, antenna panels, and/or antenna arrays to facilitate beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 5:
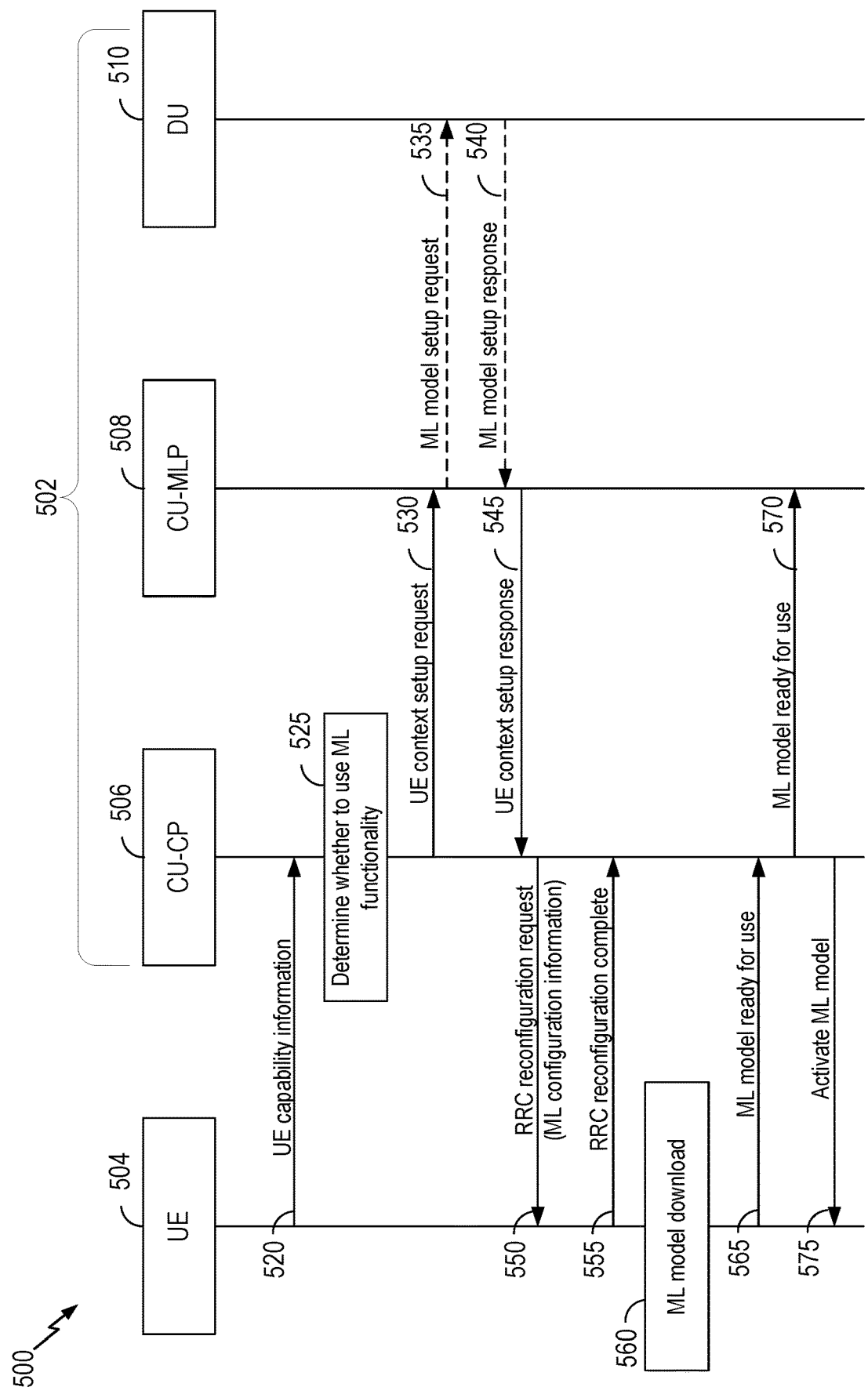
FIG. 5 is a call flow diagram illustrating example operations between a base station and user equipment for configuring and using machine learning models to perform one or more machine-learning-based wireless communications management procedures.
Figure 6:
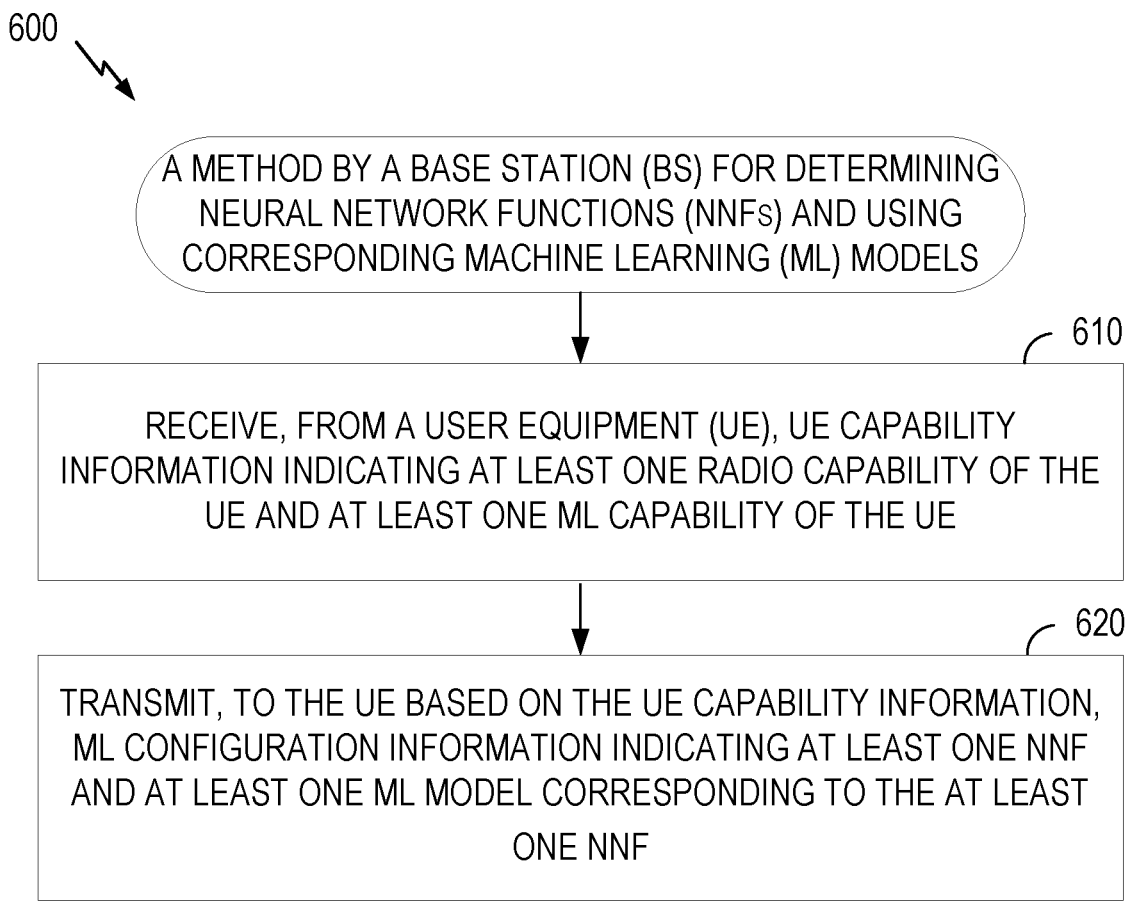
FIG. 6 is a flow diagram illustrating example operations for wireless communication by a base station.
Figure 7:
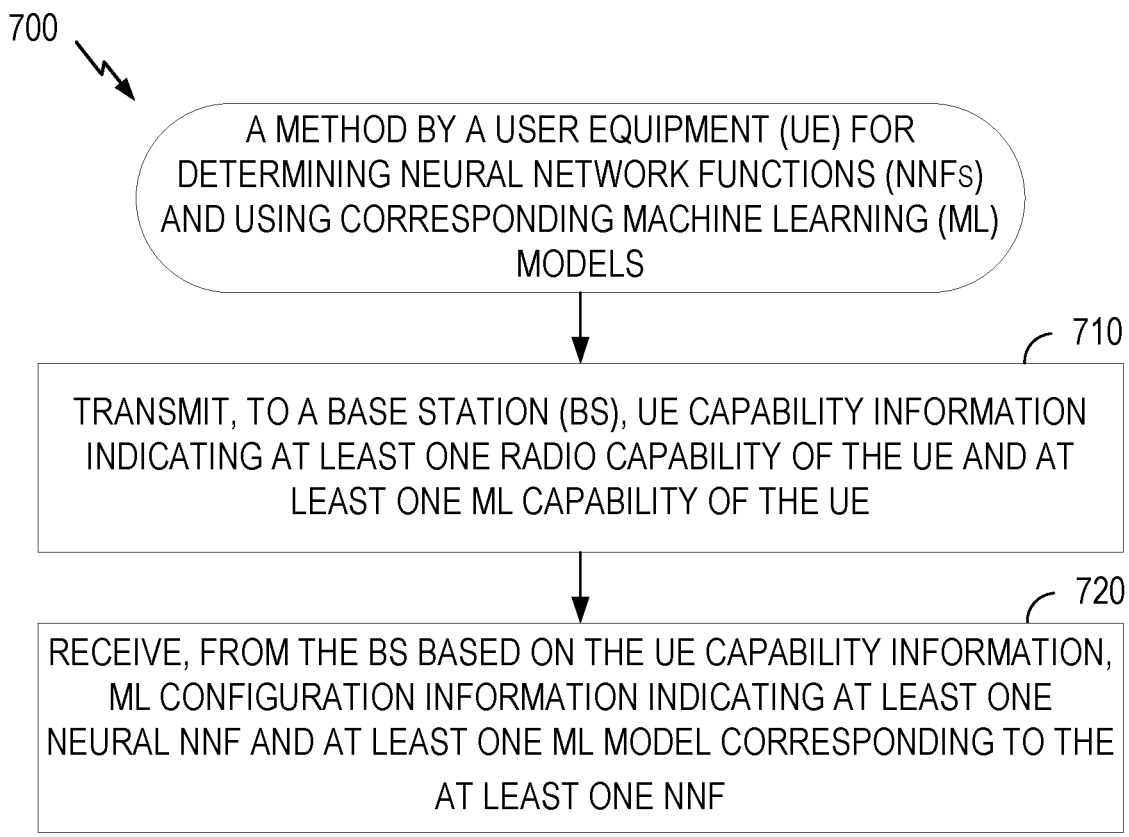
FIG. 7 is a flow diagram illustrating example operations for wireless communication by a user equipment.
Figure 8:
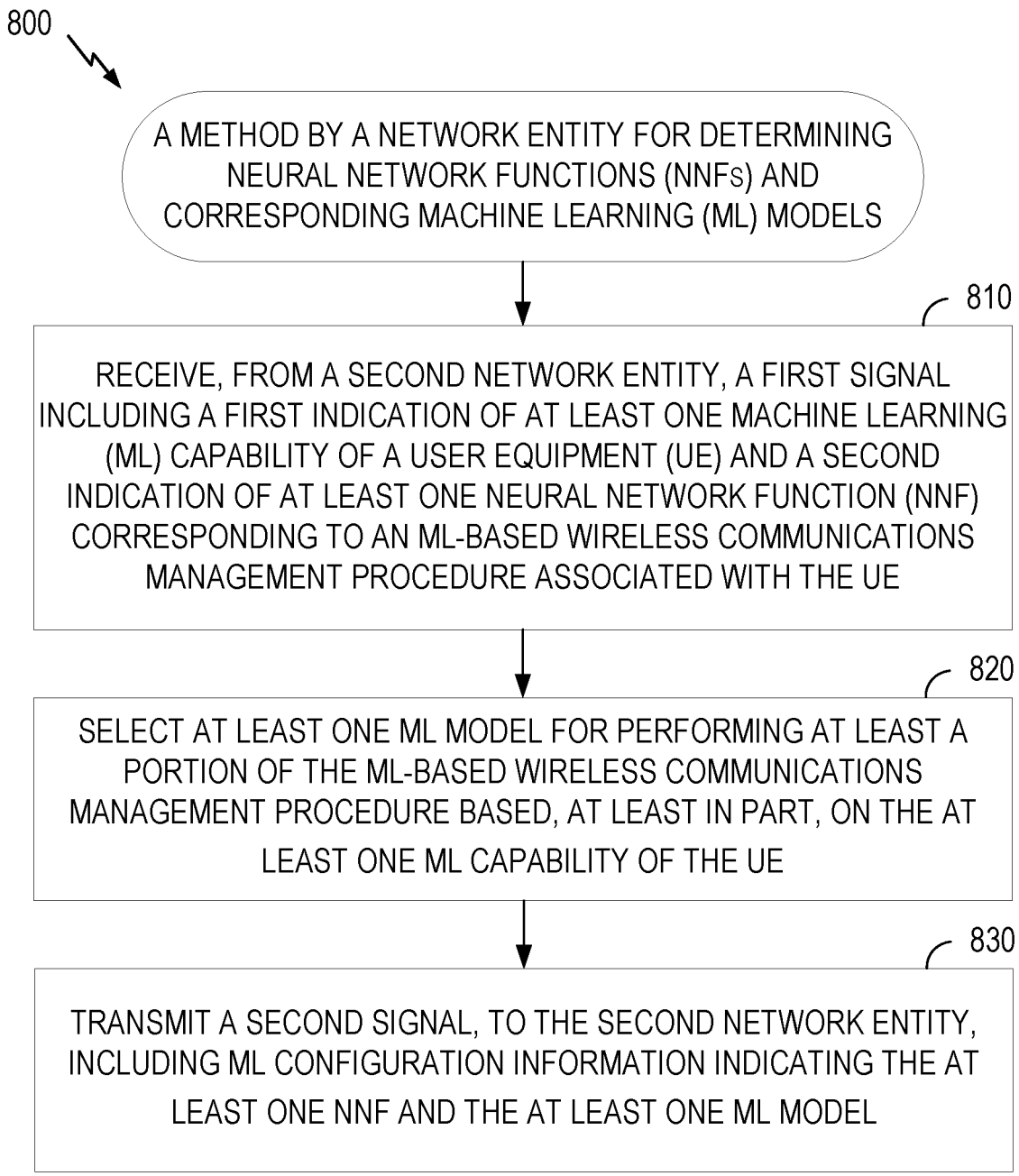
FIG. 8 is a flow diagram illustrating example operations for wireless communication by a network entity.

Wireless communications network 100 (and more particularly, a base station 102) includes ML model configuration component 199, which may be configured to perform one or more operations illustrated in FIGS. 5-6 and 8, as well as other operations described herein for determining NNFs and configuring and using corresponding ML models to perform one or more ML-based wireless communications management procedures. Wireless communications network 100 further (and more particularly, a UE 104) includes ML model configuration component 198, which may be configured to perform one or more operations illustrated in FIGS. 5 and 7, as well as other operations described herein for determining NNFs and configuring and using corresponding ML models to perform one or more ML-based wireless communications management procedures.

Figure 2:
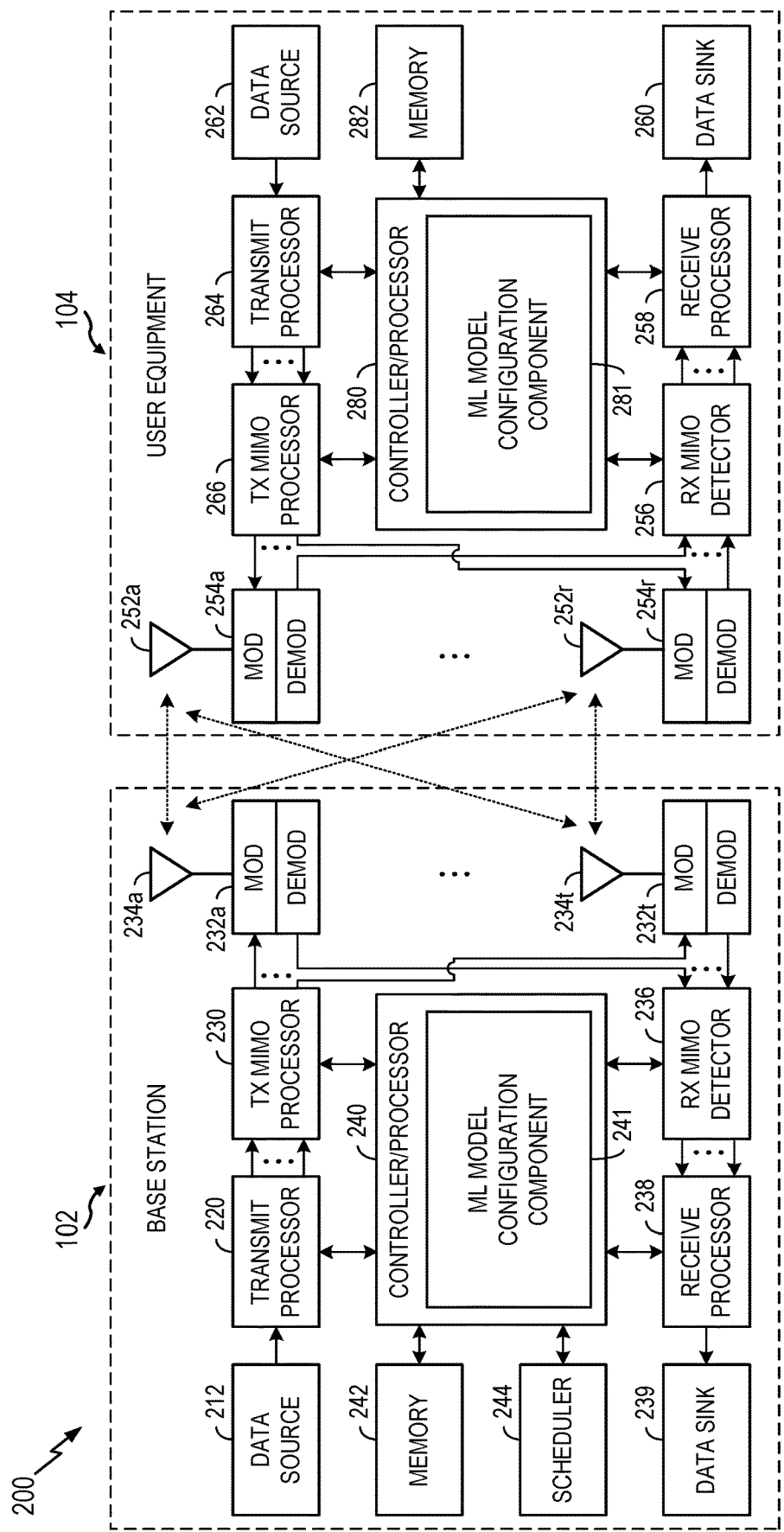
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators (modems), and other aspects, which enable wireless transmission of data (e.g., from data source 212) and wireless reception of data (e.g., to data sink 239). For example, base station 102 may send and receive data between itself and user equipment 104.

Base station 102 includes controller/processor 240, which may be configured to implement various functions related to wireless communications. In the depicted example, controller/processor 240 includes ML model configuration component 241, which may be representative of ML model configuration component 199 of FIG. 1. Notably, while depicted as an aspect of controller/processor 240, ML model configuration component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., from data source 262) and wireless reception of data (e.g., to data sink 260).

User equipment 104 includes controller/processor 280, which may be configured to implement various functions related to wireless communications. In the depicted example, controller/processor 280 includes ML model configuration component 281, which may be representative of ML model configuration component 198 of FIG. 1. Notably, while depicted as an aspect of controller/processor 280, ML model configuration component 281 may be implemented additionally or alternatively in various other aspects of user equipment 104 in other implementations.

Figure 3:
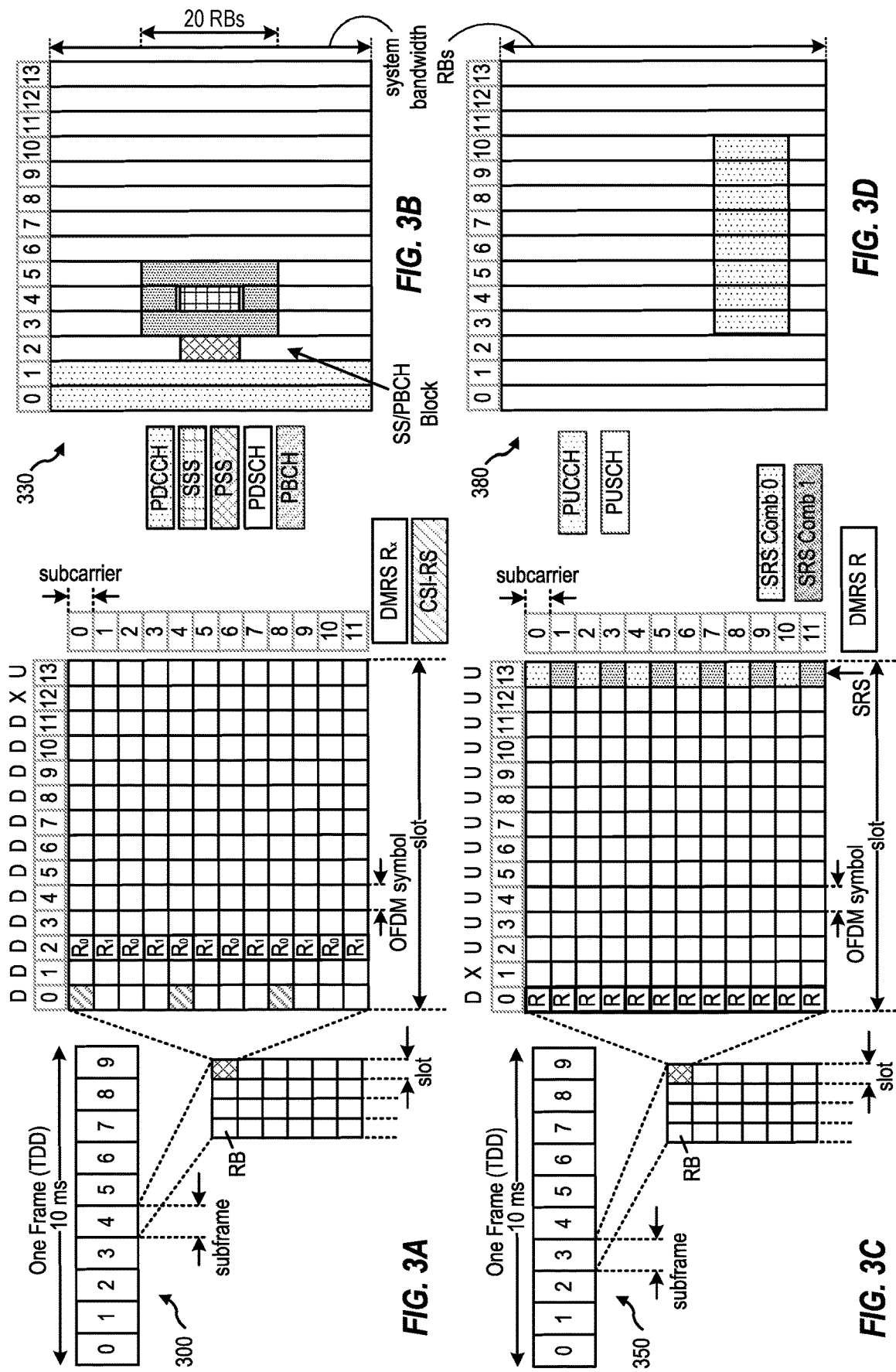
FIGS. 3A-3D depict various example aspects of data structures for a wireless communication network.

FIGS. 3A-3D depict aspects of data structures for a wireless communication network, such as wireless communications network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Machine Learning

Machine learning (ML) is generally the process of producing a predictive ML model (e.g., an artificial neural network, a tree, or other structures), which represents a generalized fit to a set of training data that is known a priori. Applying the trained model to new data produces inferences, which may be used to gain insights into the new data.

Figure 4:
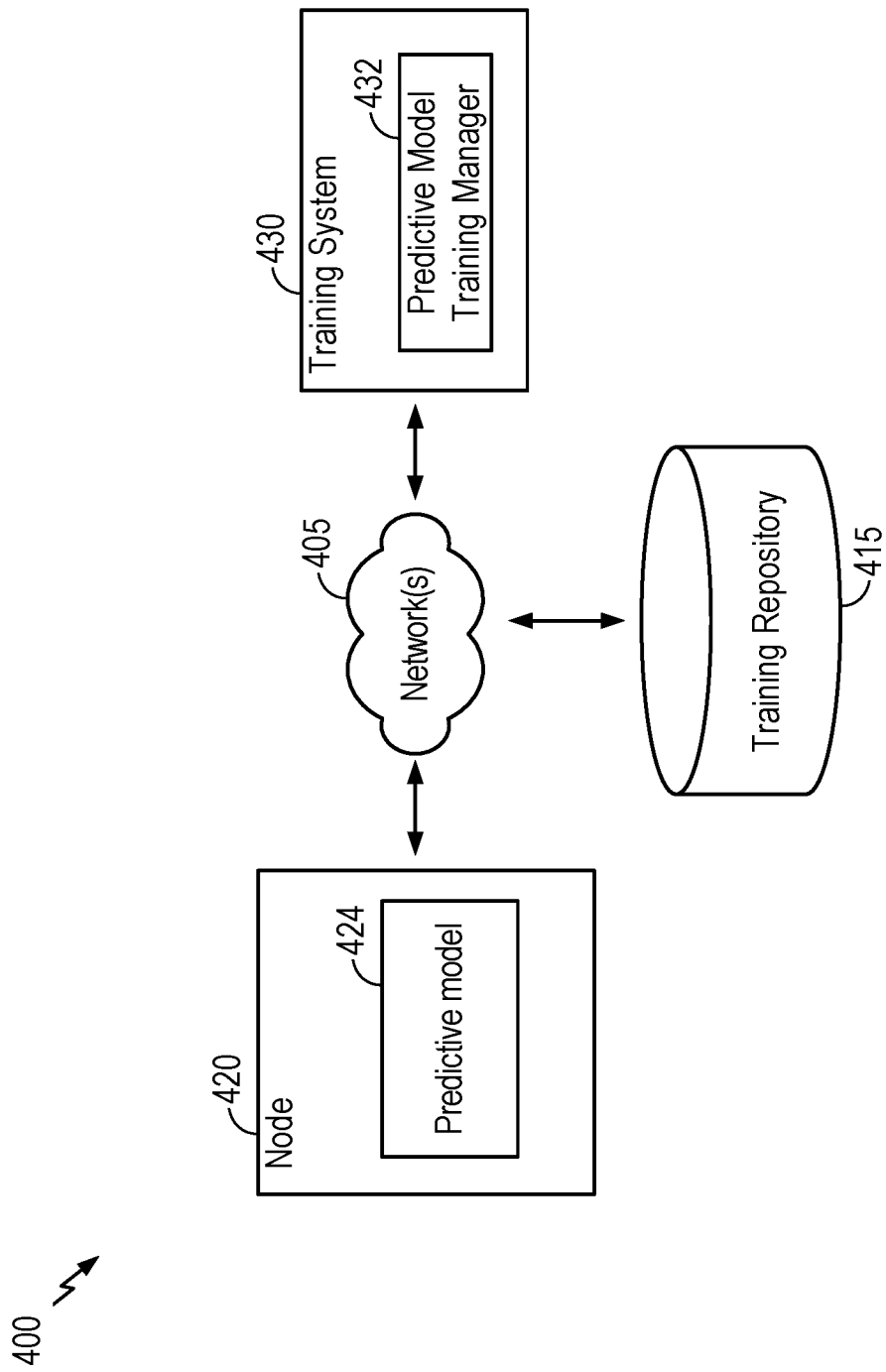
FIG. 4 illustrates an example network environment in which a node employs a predictive machine learning model.

FIG. 4 illustrates an example network environment 400 in which a node 420 employs a predictive ML model 424. As shown in FIG. 4, network environment 400 includes node 420, a training system 430, and a training repository 415, communicatively connected via network 405. Node 420 may be a UE (e.g., such as the UE 104 in the wireless communications network 100) or a BS (e.g., such as the BS 102 in the wireless communications network 100). Network 405 may include a wireless network such as wireless communications network 100, which may be a 5G NR network, a WiFi network, an long term evolution (LTE) network, and/or another type of network. While training system 430, node 420, and training repository 415 are illustrated as separate components in FIG. 4, training system 430, node 420, and training repository 415 may be implemented on any number of computing systems, either as one or more standalone systems or in a distributed environment. Additionally, while training system 430, node 420, and training repository 415 are illustrated as communicating via network 405, the training system 430, node 420, and training repository 415 may also communicate via a hardwired connection (or multiple hardwired connections) between the training system 430, node 420, and/or training repository 415.

Training system 430 generally includes a predictive model training manager 432 that uses training data to generate the predictive ML model 424 for predicting output data based on input data. Predictive ML model 424 may be generated based, at least in part, on the information in training repository 415. Training repository 415 may include training data obtained before and/or after deployment of node 420. Node 420 may be trained in a simulated communication environment (e.g., in field testing or drive testing) prior to deployment of node 420. After deployment, training repository 415 can be updated to include feedback associated with packet buffering durations used by node 420. The training repository can also be updated with information from other BSs and/or other UEs, for example, based on learned experience by those BSs and/or UEs.

Predictive model training manager 432 may use the information in training repository 415 to determine predictive ML model 424 (e.g., algorithm). Predictive model training manager 432 may use various different types of machine learning algorithms to form predictive ML model 424. Training system 430 may be located in or on node 420, a BS in the network 405, or a different entity that determines predictive ML model 424. If located on a different entity, then predictive ML model 424 is provided to node 420. Training repository 415 may be a storage device, such as a memory. Training repository 415 may be located in or on node 420, training system 430, or another entity in network 405. Training repository 415 may be in cloud storage, for example. Training repository 415 may receive training information from node 420, entities in network 405 (e.g., BSs and/or UEs in network 405), the cloud, or other sources.

Predictive model training manager 432 may use any appropriate machine learning algorithm to form the predictive ML model 424. In some non-limiting examples, the machine learning algorithm is a supervised learning algorithm, a deep learning algorithm, an artificial neural network algorithm, or other type of machine learning algorithm.

In some examples, the machine learning (e.g., used by the predictive model training manager 432 in the training system 430) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the predictive model training manager 432 in the training system 430) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet protocol (IP) cameras, Internet of things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the predictive model training manager 432 in the training system 430), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Aspects Related to Machine Learning Model Configuration

As noted above, machine learning may be employed to generate a predictive ML model that may be used to form inferences about input data. In other words, the ML model may be used to predict output data based on data input into the ML model. An ML model may be composed of a model structure and a set of parameters. The model structure may include, for example, a graph structure with vectors or matrices, and the set of parameters may include a set of weights with specific values for the vectors or matrices. In some cases, the set of parameters may be location or configuration specific.

In some cases, an ML model may be used to perform a neural network function (NNF) in a wireless communication network, such as the wireless communications network 100 illustrated in FIG. 1, and may be configured to perform one or more ML-based wireless communications management procedures within the wireless communication network. In some cases, different NNFs may correspond to different ML-based wireless communications management procedures. For example, these ML-based wireless communications management procedures may include cell reselection procedures, idle or inactive mode measurement procedures, radio resource management (RRM) measurement procedures, and the like. Each different NNF may be identified by an NNF identifier (ID), which corresponds to a particular ML-based wireless communications management procedure.

In some cases, different ML models may be employed to perform the ML-based wireless communications management procedures. In other words, multiple ML models may be associated with a particular NNF and used to perform a particular ML-based wireless communications management procedure. In some cases, the particular ML model to be used to execute an NNF may be indicated via a ML model ID.

As noted above, NNFs may be used within wireless communication networks to perform certain ML-based wireless communications management procedures. In some cases, it may be advantageous for a base station of a wireless communication network to manage these NNFs and the configuration and use of corresponding ML models at user equipments within the wireless communication network. However, there currently does not exist a way for a base station to configure a UE to perform an NNF using one or more particular ML models to execute certain ML-based wireless communications management procedures. Thus, aspects of the present disclosure provide techniques to facilitate the configuration and use of ML models within a wireless communication network to perform certain NNFs.

Example Call Flow for Determining NNFs and Configuring and Using Corresponding ML Models FIG. 5 is a call flow diagram illustrating example operations 500 between a BS 502 and a UE 504 for configuring and using NNFs and corresponding ML models to perform one or more ML-based wireless communications management procedures. In some cases, the BS 502 may be an example of the BS 102 in the wireless communications network 100 illustrated in FIG. 1. Additionally, the UE 504 may be an example of the UE 104 illustrated in FIG. 1. Further, in some cases, a Universal Mobile Telecommunications System (UMTS) air interface (Uu interface) may be established to facilitate communication between the BS 502 and UE 504; however, in other aspects, a different type of interface may be used.

As shown, the BS 502 may include a number of logical entities for performing one or more of the operations 500, such as a centralized unit control plane (CU-CP) 506 for managing the radio resource control (RRC) layer and packet data convergence protocol (PDCP) layer of the BS 502, a centralized unit ML plane (CU-MLP) 508 for managing machine learning functions, and a distributed unit (DU) 510 for managing the radio link control (RLC) layer, the media access control (MAC) layer, and parts of the physical (PHY) layer of the BS 502. While the CU-MLP 508 is illustrated in FIG. 5 as being part of the BS 502, separate from the CU-CP 506, the CU-MLP 508 may alternatively be implemented as part of the CU-CP or as (a portion of) a network entity separate from the BS 502.

Operations 500 begin at 520 with the UE 504 transmitting, to the BS 502, UE capability information indicating at least one radio capability of the UE and at least one ML capability of the UE. In some cases, the UE 504 may transmit the UE capability information during a radio resource control (RRC) setup procedure in an RRC connection setup message. In some cases, the UE capability information may be received by the CU-CP 506 of the BS 502.

In some cases, the radio capability of the UE may indicate a capability of the UE to perform one or more wireless communications management procedures, which may be ML-based. For example, the radio capability of the UE may indicate at least one of a capability to perform an (ML-based) cell reselection procedure, a capability to perform an (ML-based) idle or inactive mode measurement procedure, a capability to perform an (ML-based) radio resource management (RRM) measurement procedure, a capability to perform an (ML-based) radio link monitoring (RLM) procedure, a capability to perform an (ML-based) channel state information (CSI) measurement procedure, a capability to perform an (ML-based) precoding matrix indicator (PMI), rank indicator (RI), and channel quality indicator (CQI) feedback procedure, a capability to perform an (ML-based) radio link failure (RLF) and beam failure recovery (BFR) procedure, or a capability to perform an (ML-based) RRM relaxation procedure.

In some cases, the at least one ML capability of the UE may indicate one or more capabilities supported by the UE for performing ML. For example, the ML capability of the UE may indicate at least one of an ML training capability, an ML inference capability, a processing capability, one or more supported ML model formats, one or more supported ML libraries, or an indication of one or more locally cached ML models.

At 525, the CU-CP 506 of the BS 502 determines whether to use ML functionality to perform one or more wireless communications management procedures. For example, in some cases, the CU-CP 506 of the BS 502 may select an ML-based wireless communications management procedure to be used at the UE and determine the at least one NNF for performing at least a portion of the selected ML-based wireless communications management procedure. In other words, the BS 502 may determine which NNFs, if any, are supported by the UE at 525 and may generate a requested NNF list.

Thereafter, at 530, the CU-CP 506 sends a context setup request message to the CU-MLP 508 to establish a context for the UE 504 for using the at least one NNF. The context setup request message includes an indication of the at least one NNF determined by the CU-CP 506 (e.g., the requested NNF list) and a request to the CU-MLP 508 to support the use of the at least one NNF. While FIG. 5 illustrates the use of a context setup request message for requesting that the CU-MLP 508 support the use of the at least one NNF, it should be understood that other or additional signaling procedures may be used.

The context setup request message may include the at least one ML capability of the UE. The CU-MLP 508 may then select at least one ML model for use in the at least one NNF to perform at least the portion of the ML-based wireless communications management procedure. In some cases, the CU-MLP 508 may select the at least one ML model based, at least in part, on the at least one ML capability of the UE. Additionally, in some cases, the CU-MLP 508 may select the at least one ML model based on at least one of a cell ID, gNB ID, or UE context information. In some cases, the UE context information may indicate such information as a UE type, a data radio bearer (DRB) configuration, and/or an antenna switching (AS) configuration.

Thereafter, at 545, the CU-MLP 508 sends a context setup response message to the CU-CP 506. The context setup response message may provide an indication that the UE context has been successfully set up for the at least one NNF indicated in the context setup request message (e.g., an accepted NNF list). Additionally, the context setup response message may provide an indication of the at least one ML model selected for the at least one NNF to perform at least the portion of the ML-based wireless communications management procedure. In some cases, the indication of the at least one ML model may comprise an ML model ID.

Thereafter, as illustrated at 550, the BS 502 (e.g., via the CU-CP 506) transmits, to the UE 504 based on the UE capability information received at 520, ML configuration information. In some cases, the BS 502 may transmit the ML configuration information in an RRC reconfiguration message. The ML configuration information may include an indication of the at least one NNF (e.g., the accepted NNF list) and the at least one ML model corresponding to the at least one NNF. In some cases, the at least one NNF is indicated by an NNF ID and the at least one ML model is indicated by an ML model ID. As noted, the at least one ML model may be associated with a model structure and one or more sets of parameters (e.g., weights, biases, and/or activation functions). In some cases, the ML model ID may indicate the model structure associated with the at least one ML model, while the one or more sets of parameters may be indicated in the ML configuration information by a parameter set ID.

In some cases, the ML model and ML model structure may be associated with multiple sets of parameters (e.g., the one or more sets of parameters include multiple sets of parameters). In such cases, each set of parameters may be valid for use with the model structure for a particular geographic area, such as a cell, or a particular configuration. In other words, depending on, for example, the particular geographic area or configuration of the UE 504, different sets of parameters may be used with the model structure. This may allow the UE 504 to use one model structure for performing the ML-based wireless communications management procedure while adaptively changing the set of parameters used with the model structure depending on the particular geographic area or configuration of the UE 504.

Thereafter, as illustrated at 555, in response to receiving the RRC reconfiguration message including the ML configuration information, the UE 504 transmits an RRC reconfiguration complete message to the BS 502, which may indicate that the UE 504 successfully received the ML configuration information.

As illustrated at 560, the UE 504 may then download the at least one ML model corresponding to the at least one NNF if the at least one ML model is not locally stored at the UE 504 already. For example, in some cases, if the ML model is not locally stored by the UE 504, the UE 504 may receive, from the BS 502 at least one of the ML model structure corresponding to the at least one ML model or the one or more sets of parameters (e.g., weights, biases, and/or activation functions) associated with the ML model structure.

Thereafter, as illustrated at 565, once the UE 504 has received the ML structure and/or one or more parameters associated with the at least one ML model, the UE 504 transmits a message to the BS 502, indicating that the at least one ML model is ready to be used by the UE 504. In some cases, the message may be received by the CU-CP 506 and, thereafter, forwarded to the CU-MLP 508, as illustrated at 570.

Thereafter, at some point in the future, the BS 502 may decide that the UE 504 should use the at least one NNF and corresponding at least one ML model to perform at least the portion of the ML-based wireless communications management procedure. In such cases, the BS 502 transmits a signal to the UE 504, activating use of the at least one ML model to perform the at least the portion of the ML-based wireless communications management procedure. In some cases, the signal activating the use of the at least one ML model may be transmitted by the BS 502 (e.g., via the CU-CP 506 or CU-MLP 508) in a media access control-control element (MAC-CE) or in RRC signaling.

Thereafter, the UE 504 may perform the ML-based wireless communications management procedure using the at least one ML model based on the activation signal. In some cases, performing the ML-based wireless communications management procedure may include inputting one or more input variables to the at least one ML model and obtaining an output from the at least one ML model based on the one or more input variables.

As noted above, the at least one ML model may be associated with a model structure and one or more sets of parameters. When performing the ML-based wireless communications management procedure, the UE 504 may determine a particular set of parameters to use in combination with the ML structure to process the one or more input variables. This determination may be based on, for example, a particular geographic area, such as a cell, or configuration of the UE 504. For example, in some cases, when the UE 504 is in a first cell, the UE 504 may select a first set of parameters for use with the model structure to perform the ML-based wireless communications management procedure. In other cases, when the UE 504 is in a second cell, the UE 504 may select a second set of parameters for use with the model structure to perform the ML-based wireless communications management procedure.

As an example, the ML-based wireless communications management procedure may include a cell reselection and idle/inactive mode measurement procedure. In such cases, to perform the cell reselection and idle/inactive mode measurement procedure, the UE 504 may input one or more input variables into a model structure of an ML model specifically trained for cell reselection and idle/inactive mode measurements. The UE 504 may also select a set of parameters to use with the model structure (e.g., weights, biases, and/or activation functions), as described above. In some cases, the input variables to the ML model may include, for example, serving cell measurements (e.g., reference signal received power (RSRP) measurements associated with the BS 502), neighboring cell measurements, services specified by the UE 504. The at least one ML model may take into account the serving cell measurements, the neighboring cell measurements, and the services specified by the UE 504, and provide an output, indicating a target cell to reselect and/or target cells to perform the idle/inactive mode measurements.

Additional Considerations Regarding Use of NNFs and Corresponding ML Models in Both a Base Station and a User Equipment In some cases, NNFs and corresponding ML models may be used in both the BS 502 and the UE 504. For example, in view of the description above, the BS 502 may configure the UE 504 with a particular NNF and corresponding first ML model for performing at least a portion of one or more ML-based wireless communications management procedure. However, the BS 502 may also configure itself with a second ML model for performing at least a portion of the ML-based wireless communications management procedure. In some cases, the first ML model and the second ML model may comprise matched ML models whereby the output of one of the ML models is used as an input to the other ML model.

For example, returning to FIG. 5, after setting up the context for the UE 504 associated with the at least one NNF and selecting the at least one ML model (e.g., the first ML model) corresponding to the at least one NNF, the CU-MLP 508 may additionally determine a second ML model for the BS 502 to perform at least a portion of the ML-based wireless communications management procedure. In some cases, the CU-MLP 508 may determine the other ML model for the BS 502 based on ML capability information associated with the DU 510. As shown at 535, the CU-MLP 508 may then send an ML model setup request message to the DU 510, requesting that the DU 510 set up the second ML model for performing at least a portion of the ML-based wireless communications management procedure. Thereafter, once the second ML model has been set up, the DU 510 sends an ML model setup response message to the CU-MLP 508 at 540, indicating that the setup of the second ML model is complete.

As noted above, in some cases, the first ML model configured for use by the UE 504 may be matched with the second ML model configured for use by the BS 502. In other words, an output of the first ML model used by the UE 504 may be used as an input to the second ML model used by the BS 502.

For example, as noted above, the BS 502 may transmit a signal activating the use of the first ML model (e.g., the at least one ML model, described above) for performing the ML-based wireless communications management procedure. The BS 502 may also activate use of the second ML model at the BS 502. Thereafter, the UE 504 may perform the ML-based wireless communications management procedure by inputting one or more input variables to the first ML model and obtaining an output from the first ML model based on the one or more input variables. The UE 504 may then transmit the output of the first ML model, which may be received by the BS 502. The BS may then input the output received from the UE to the second ML model at the BS 502 and obtain an output to the second ML model at the BS.

An example use case for this matched ML model configuration between the first ML model and the second ML model may be for performing certain functions, such as data compression for reporting channel state information (CSI) feedback. For example, in cases where a wireless communication network employs a large number of antennas, such as in massive multiple-input, multiple-output (MIMO) scenarios, CSI feedback may be very large. In such cases, the first ML model may be used by the UE 504 to compress the CSI feedback to conserve time and frequency resources on a radio channel when the UE 504 transmits the CSI feedback to the BS 502. Once the CSI feedback is received by the BS 502, the BS 502 may use the second ML model to decompress the CSI feedback.

Example Methods for Determining NNFs and Configuring and Using Corresponding ML Models FIG. 6 is a flow diagram illustrating example operations 600 for wireless communication. The operations 600 may be performed, for example, by a BS (e.g., such as the BS 102 in the wireless communications network 100 of FIG. 1) and/or another network entity (e.g., a device implementing the CU-CP 506 or CU-MLP 508) for determining NNFs and configuring and using corresponding ML models for performing one or more ML-based wireless communications management procedures. The operations 600 may be implemented as software components that are executed and run on one or more processors (e.g., controller/processor 240 of FIG. 2). Further, the transmission and reception of signals by the BS (and/or other network entity) in operations 600 may be enabled, for example, by one or more transceivers and antennas (e.g., transceivers 232 and antennas 234 of FIG. 2). In certain aspects, the transmission and/or reception of signals by the BS (and/or other network entity) may be implemented via a bus interface of one or more processors (e.g., controller/processor 240, including the ML model configuration component 241) obtaining and/or outputting signals.

Operations 600 begin at block 610 with receiving, from a user equipment (UE), UE capability information indicating at least one radio capability of the UE and at least one machine learning (ML) capability of the UE.

In block 620, the BS or other network entity transmits, to the UE based on the UE capability information, ML configuration information indicating at least one neural network function (NNF) and at least one ML model corresponding to the at least one NNF.

In some cases, in the ML configuration information, the at least one NNF is indicated by an NNF identifier (ID) and the at least one ML model is indicated by an ML model ID.

In some cases, the at least one NNF comprises at least a portion of an ML-based wireless communications management procedure, and the ML model is configured to perform the at least the portion of the ML-based wireless communications management procedure.

In some cases, the ML-based wireless communications management procedure comprises at least one of: a cell reselection procedure, an idle or inactive mode measurement procedure, a radio resource management (RRM) measurement procedure, a radio link monitoring (RLM) procedure, a channel state information (CSI) measurement procedure, a precoding matrix indicator (PMI), rank indicator (RI), and channel quality indicator (CQI) feedback procedure, a radio link failure (RLF) and beam failure recovery (BFR) procedure, or a power saving procedure.

In some cases, operations 600 may further include the BS or other network entity selecting the ML-based wireless communications management procedure to be used at the UE. In some cases, operations 600 may further include the BS or other network entity determining the at least one NNF corresponding to the selected ML-based wireless communications management procedure. In some cases, operations 600 may further include the BS or other network entity selecting the at least one ML model for performing the at least the portion of the ML-based wireless communications management procedure based, at least in part, on at least one of the radio capability of the UE or the ML capability of the UE.

In some cases, operations 600 may further include the BS or other network entity establishing a context for the UE based, at least in part, on the at least one NNF, the at least one ML model, and the at least one ML capability of the UE.

In some cases, the at least one ML model for performing the at least the portion of the ML-based wireless communications management procedure comprises an ML model structure and one or more sets of parameters associated with the ML model structure. In some cases, the one or more sets of parameters comprise a set of weights, which may be indicated in the ML configuration information by a parameter set ID. In some cases, operations 600 may further include the BS or other network entity transmitting at least one of the ML model structure or the one or more sets of parameters associated with the ML model structure, to the UE.

In some cases, operations 600 may further include the BS or other network entity receiving, from the UE after transmitting the ML configuration information, a signal indicating that the at least one ML model is ready to be used. In some cases, operations 600 may further include the BS or other network entity transmitting, to the UE, a signal activating use of the at least one ML model to perform the at least the portion of the ML-based wireless communications management procedure. In some cases, transmitting the signal activating the use of the at least one ML model comprises transmitting the signal activating the use of the at least one ML model in a media access control element (MAC-CE) or in radio resource control (RRC) signaling.

In some cases, operations 600 may further include the BS or other network entity activating use of a second ML model at the BS or other network entity, receiving a UE output of the at least one ML model from the UE, inputting the UE output to the second ML model at the BS or other network entity, and obtaining an output to the second ML model at the BS or other network entity.

In some cases, receiving the UE capability information comprises receiving the UE capability information in a radio resource control (RRC) connection setup message. Additionally, in some cases, transmitting the ML configuration information comprises transmitting the ML configuration information in a radio resource control (RRC) reconfiguration message.

In some cases, the at least one radio capability of the UE comprises at least one of: a capability to perform an ML-based cell reselection procedure, a capability to perform an ML-based idle or inactive mode measurement procedure, a capability to perform an ML-based radio resource management (RRM) measurement procedure, a capability to perform an ML-based radio link monitoring (RLM) procedure, a capability to perform an ML-based channel state information (CSI) measurement procedure, a capability to perform an ML-based precoding matrix indicator (PMI), rank indicator (RI), and channel quality indicator (CQI) feedback procedure, a capability to perform an ML-based radio link failure (RLF) and beam failure recovery (BFR) procedure, or a capability to perform an ML-based RRM relaxation procedure.

In some cases, the at least one ML capability of the UE comprises at least one of: an ML training capability, an ML inference capability, a processing capability, one or more supported ML model formats, one or more supported ML libraries, or an indication of one or more locally cached ML models.

FIG. 7 is a flow diagram illustrating example operations 700 for wireless communication, in accordance with certain aspects of the present disclosure. The operations 700 may be performed, for example, by a UE (e.g., such as the UE 104 in the wireless communications network 100 of FIG. 1) for determining NNFs and configuring and using corresponding ML models for performing one or more ML-based wireless communications management procedures. The operations 700 may be complementary to the operations 600 performed by the BS and/or other network entity. The operations 700 may be implemented as software components that are executed and run on one or more processors (e.g., controller/processor 280 of FIG. 2). Further, the transmission and reception of signals by the UE in operations 600 may be enabled, for example, by one or more transceivers and antennas (e.g., transceivers 254 and antennas 252 of FIG. 2). In certain aspects, the transmission and/or reception of signals by the UE may be implemented via a bus interface of one or more processors (e.g., controller/processor 280, including the ML model configuration component 281) obtaining and/or outputting signals.

Operations 700 begin at block 710 with transmitting, to a base station (BS) and/or other network entity, UE capability information indicating at least one radio capability of the UE and at least one machine learning (ML) capability of the UE.

In block 720, the UE receives, from the BS or other network entity based on the UE capability information, ML configuration information indicating at least one neural network function (NNF) and at least one ML model corresponding to the at least one NNF.

In some cases, in the ML configuration information the at least one NNF is indicated by an NNF identifier (ID) and the at least one ML model is indicated by an ML model ID. Additionally, in some cases, the at least one NNF comprises at least a portion of an ML-based wireless communications management procedure, and the ML model is configured to perform the at least the portion of the ML-based wireless communications management procedure.

In some cases, the ML-based wireless communications management procedure comprises at least one of: a cell reselection procedure, an idle or inactive mode measurement procedure, a radio resource management (RRM) measurement procedure, a radio link monitoring (RLM) procedure, a channel state information (CSI) measurement procedure, a precoding matrix indicator (PMI), rank indicator (RI), and channel quality indicator (CQI) feedback procedure, a radio link failure (RLF) and beam failure recovery (BFR) procedure, or a power saving procedure.

In some cases, the at least one ML model for performing the ML-based wireless communications management procedure comprises an ML model structure and one or more sets of parameters associated with the ML model structure. In some cases, the one or more sets of parameters comprise a set of weights, which may be indicated in the ML configuration information by a parameter set ID. In some cases, operations 700 further include the UE receiving (indication(s) of) at least one of the ML model structure or the one or more sets of parameters associated with the ML model structure, from the BS or other network entity.

In some cases, operations 700 further include the UE transmitting, to the BS or other network entity after receiving the (indication(s) of) at least one of the ML model structure or the one or more sets of parameters, a signal indicating that the at least one ML model is ready to be used.

In some cases, operations 700 further include the UE receiving, from the BS or other network entity, a signal activating use of the at least one ML model to perform the at least the portion of the ML-based wireless communications management procedure. In some cases, receiving the signal activating the use of the at least one ML model comprises receiving the signal activating the use of the at least one ML model in a media access control element (MAC-CE) or in radio resource control (RRC) signaling.

In some cases, operations 700 further include the UE performing the ML-based wireless communications management procedure using the at least one ML model based on the activation signaling. In some cases, performing the ML-based wireless communications management procedure comprises: inputting one or more input variables to the at least one ML model, obtaining an output from the at least one ML model based on the one or more input variables, and transmitting the output of the at least one ML model to the BS or other network entity.

In some cases, transmitting the UE capability information comprises transmitting the UE capability information during a radio resource control (RRC) connection setup procedure. In some cases, receiving the ML configuration information comprises receiving the ML configuration information in a radio resource control (RRC) reconfiguration message.

In some cases, the at least one radio capability of the UE comprises at least one of: a capability to perform an ML-based cell reselection procedure, a capability to perform an ML-based idle or inactive mode measurement procedure, a capability to perform an ML-based radio resource management (RRM) measurement procedure, a capability to perform an ML-based radio link monitoring (RLM) procedure, a capability to perform an ML-based channel state information (CSI) measurement procedure, a capability to perform an ML-based precoding matrix indicator (PMI), rank indicator (RI), and channel quality indicator (CQI) feedback procedure, a capability to perform an ML-based radio link failure (RLF) and beam failure recovery (BFR) procedure, or a capability to perform an ML-based RRM relaxation procedure.

In some cases, the at least one ML capability of the UE comprises at least one of: an ML training capability, an ML inference capability, a processing capability, one or more supported ML model formats, one or more supported ML libraries, or an indication of one or more locally cached ML models.

FIG. 8 is a flow diagram illustrating example operations 800 for wireless communication. The operations 800 may be performed, for example, by a first network entity (e.g., device implementing the CU-MLP 508) for determining NNFs and configuring and using corresponding ML models for performing one or more ML-based wireless communications management procedures. The operations 800 may be implemented as software components that are executed and run on one or more processors. Further, the transmission and reception of signals by the network entity in operations 800 may be enabled, for example, by one or more transceivers and antennas. In certain aspects, the transmission and/or reception of signals by the network entity may be implemented via a bus interface of one or more processors obtaining and/or outputting signals.

Operations 800 begin in block 810 with receiving, from a second network entity, a first signal including a first indication of at least one machine learning (ML) capability of a user equipment (UE) and a second indication of at least one neural network function (NNF) corresponding to an ML-based wireless communications management procedure associated with the UE.

In block 820, the first network entity selects at least one ML model for performing at least a portion of the ML-based wireless communications management procedure based, at least in part, on the at least one ML capability of the UE.

In block 830, the first network entity transmits a second signal, to the second network entity, including ML configuration information indicating the at least one NNF and the at least one ML model.

In some cases, in the ML configuration information: the at least one NNF is indicated by an NNF identifier (ID), and the at least one ML model is indicated by an ML model ID.

In some cases, the at least one ML model comprises an ML model structure and one or more sets of parameters associated with the ML model structure.

In some cases, operations 800 further include determining the ML model structure and the one or more sets of parameters associated with the ML model structure.

In some cases, the one or more sets of parameters comprise at least a set of weights, and the one or more parameters are indicated in the ML configuration information by a parameter set ID.

In some cases, operations 800 further include transmitting a third signal, to a third network entity, including an indication of the at least one NNF and a second ML model corresponding to the at least one NNF for performing at least another portion of the ML-based wireless communications management procedure.

In some cases, the first network entity comprises a centralized unit machine learning plane (CU-MLP) entity, the second network entity comprises a centralized unit control plane (CU-CP) entity, and the third network entity comprises a distributed unit (DU) entity. In some cases, the CU-CP entity is a part of a base station, and the CU-MLP entity is at least a portion of an entity separate from the base station.

In some cases, operations 800 further include receiving a third signal, forwarded by the second network entity from the UE, indicating that the at least one ML model is ready to be used.

In some cases, operations 800 further include establishing a context for the UE for the at least one NNF. In such cases, the first signal comprises a context setup request message and the second signal comprises a context setup response message.

In some cases, the at least one ML capability of the UE comprises at least one of: an ML training capability, an ML inference capability, a processing capability, one or more supported ML model formats, one or more supported ML libraries, or an indication of one or more locally cached ML models.

In some cases, operations 800 further include transmitting, to the UE, a third signal activating use of the at least one ML model to perform the at least the portion of the ML-based wireless communications management procedure. In some cases, transmitting the third signal activating the use of the at least one ML model comprises transmitting the third signal activating the use of the at least one ML model in a media access control element (MAC-CE) or in radio resource control (RRC) signaling.

Example Wireless Communication Devices

Figure 9:
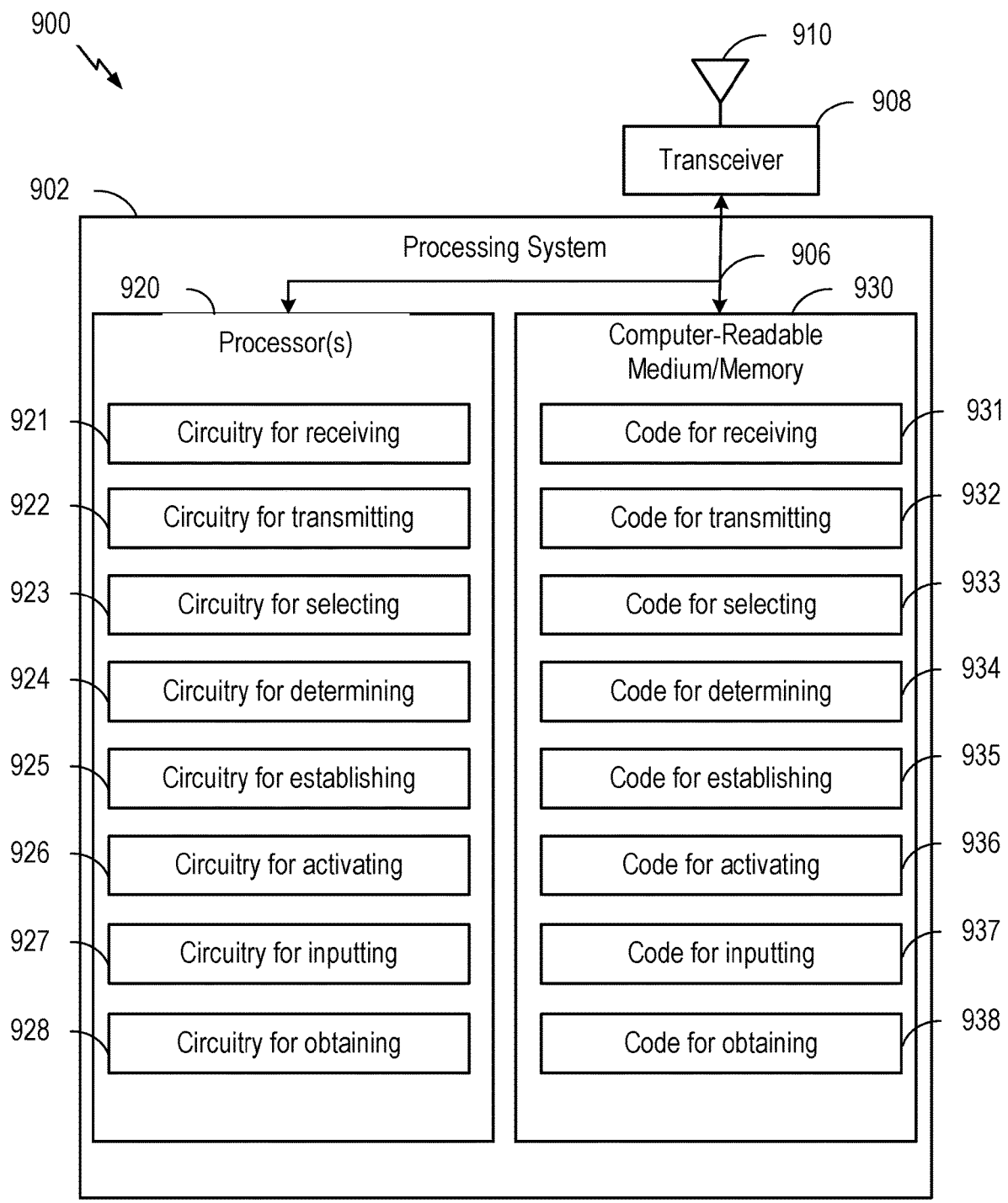
FIGS. 9-10 depict aspects of example communications devices.

FIG. 9 depicts an example communications device 900 that includes various components operable, configured, or adapted to perform operations for the techniques disclosed herein, such as the operations depicted and described with respect to FIGS. 5-6 and 8. In some examples, communications device 900 may be a base station 102 as described, for example with respect to FIGS. 1 and 2, or other network entity, such as the CU-CP 506 or the CU-MLP 508 (e.g., when implemented as a standalone device).

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5-6 and 8, or other operations for performing the various techniques discussed herein for determining NNFs and configuring and using corresponding ML models for performing one or more ML-based wireless communications management procedures.

In the depicted example, computer-readable medium/memory 930 stores code 931 for receiving, code 932 for transmitting, code 933 for selecting, code 934 for determining, code 935 for establishing, code 936 for activating, code 837 for inputting, and code 838 for obtaining.

In the depicted example, the one or more processors 920 include circuitry configured to implement the code stored in the computer-readable medium/memory 930, including circuitry 921 for receiving, circuitry 922 for transmitting, circuitry 923 for selecting, circuitry 924 for determining, circuitry 925 for establishing, circuitry 926 for activating, circuitry 827 for inputting, and circuitry 828 for obtaining.

Various components of communications device 900 may provide means for performing the methods described herein, including with respect to FIGS. 5-6 and 8.

In some examples, means for transmitting or sending (or means for outputting for transmission) may include the transceivers 232 and/or antenna(s) 234 of the base station 102 illustrated in FIG. 2 and/or transceiver 908 and antenna 910 of the communications device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communications device 900 in FIG. 9.

In some examples, means for selecting, means for determining, means for establishing, means for activating, means for inputting, and means for obtaining may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including ML model configuration component 241).

Notably, FIG. 9 is an example, and many other examples and configurations of communications device 900 are possible.

Figure 10:
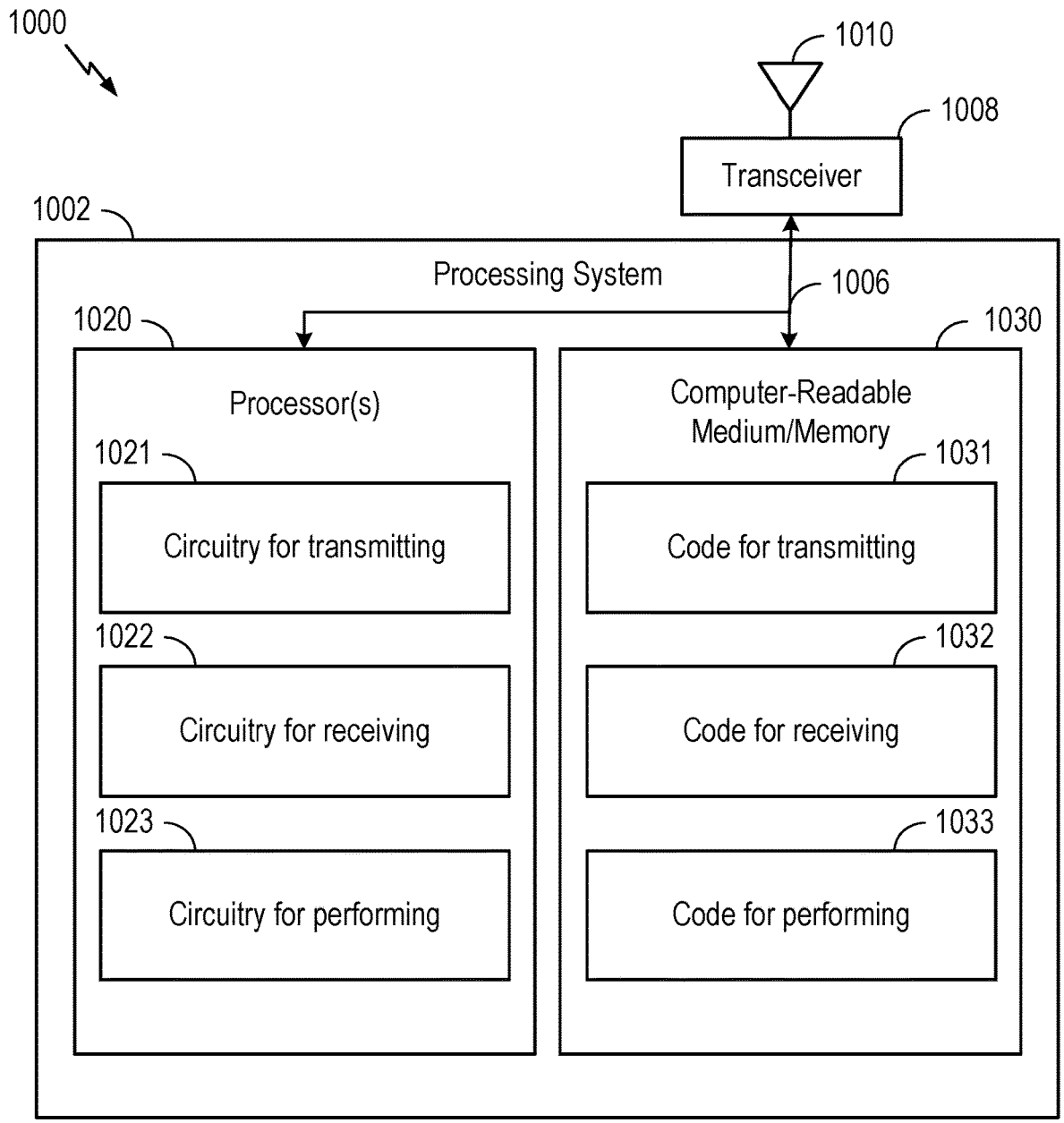

FIG. 10 depicts an example communications device 1000 that includes various components operable, configured, or adapted to perform operations for the techniques disclosed herein, such as the operations depicted and described with respect to FIGS. 5 and 7. In some examples, communications device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 5 and 7, or other operations for performing the various techniques discussed herein for determining NNFs and configuring and using corresponding ML models for performing one or more ML-based wireless communications management procedures.

In the depicted example, computer-readable medium/memory 1030 stores code 1031 for transmitting, code 1032 for receiving, and code 1033 for performing.

In the depicted example, the one or more processors 1020 include circuitry configured to implement the code stored in the computer-readable medium/memory 1030, including circuitry 1021 for transmitting, circuitry 1022 for receiving, and circuitry 1023 for performing.

Various components of communications device 1000 may provide means for performing the methods described herein, including with respect to FIGS. 5 and 7.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communications device 1000 in FIG. 10.

In some examples, means for receiving (or means for obtaining) may include the transceivers 254 and/or antenna(s) 252 of the user equipment 104 illustrated in FIG. 2 and/or transceiver 1008 and antenna 1010 of the communications device 1000 in FIG. 10.

In some examples, means for performing may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including ML model configuration component 281).

Notably, FIG. 10 is an example, and many other examples and configurations of communications device 1000 are possible.

Example Clauses

Implementation examples are described in the following numbered clauses:

Clause 1: A method for wireless communication by a user equipment (UE), comprising: transmitting, to a base station (BS) or other network entity, UE capability information indicating at least one radio capability of the UE and at least one machine learning (ML) capability of the UE; and receiving, from the BS or other network entity based on the UE capability information, ML configuration information indicating at least one neural network function (NNF) and at least one ML model corresponding to the at least one NNF.

Clause 2: The method of Clause 1, wherein in the ML configuration information: the at least one NNF is indicated by an NNF identifier (ID), and the at least one ML model is indicated by an ML model ID.

Clause 3: The method of any of Clauses 1-2, wherein: the at least one NNF comprises at least a portion of an ML-based wireless communications management procedure, and the ML model is configured to perform the at least the portion of the ML-based wireless communications management procedure.

Clause 4: The method of Clause 3, wherein the ML-based wireless communications management procedure comprises at least one of: a cell reselection procedure, an idle or inactive mode measurement procedure, a radio resource management (RRM) measurement procedure, a radio link monitoring (RLM) procedure, a channel state information (CSI) measurement procedure, a precoding matrix indicator (PMI), rank indicator (RI), and channel quality indicator (CQI) feedback procedure, a radio link failure (RLF) and beam failure recovery (BFR) procedure, or a power saving procedure.

Clause 5: The method of any of Clauses 3-4, wherein the at least one ML model for performing the ML-based wireless communications management procedure comprises an ML model structure and one or more parameters associated with the ML model structure.

Clause 6: The method of Clause 5, wherein the one or more parameters comprise a set of weights, and the one or more parameters are indicated in the ML configuration information by a parameter set ID.

Clause 7: The method of any of Clauses 5-6, further comprising receiving at least one of the ML model structure or the one or more parameters associated with the ML model structure, from the B S or other network entity.

Clause 8: The method of Clause 7, further comprising transmitting, to the BS or other network entity after receiving the at least one of the ML model structure or the one or more parameters, a signal indicating that the at least one ML model is ready to be used.

Clause 9: The method of any of Clauses 3-8, further comprising receiving, from the BS or other network entity, a signal activating use of the at least one ML model to perform the at least the portion of the ML-based wireless communications management procedure.

Clause 10: The method of Clause 9, further comprising performing the ML-based wireless communications management procedure using the at least one ML model based on the activation signal, wherein performing the ML-based wireless communications management procedure comprises: inputting one or more input variables to the at least one ML model; obtaining an output from the at least one ML model based on the one or more input variables; and transmitting the output of the at least one ML model to the B S or other network entity.

Clause 11: The method of any of Clauses 9-10, wherein receiving the signal activating the use of the at least one ML model comprises receiving the signal activating the use of the at least one ML model in a media access control element (MAC-CE) or in radio resource control (RRC) signaling.

Clause 12: The method of any of Clauses 1-11, wherein transmitting the UE capability information comprises transmitting the UE capability information during a radio resource control (RRC) connection setup procedure.

Clause 13: The method of any of Clauses 1-12, wherein receiving the ML configuration information comprises receiving the ML configuration information in a radio resource control (RRC) reconfiguration message.

Clause 14: The method of any of Clauses 1-13, wherein the at least one radio capability of the UE comprises at least one of: a capability to perform an ML-based cell reselection procedure, a capability to perform an ML-based idle or inactive mode measurement procedure, a capability to perform an ML-based radio resource management (RRM) measurement procedure, a capability to perform an ML-based radio link monitoring (RLM) procedure, a capability to perform an ML-based channel state information (CSI) measurement procedure, a capability to perform an ML-based precoding matrix indicator (PMI), rank indicator (RI), and channel quality indicator (CQI) feedback procedure, a capability to perform an ML-based radio link failure (RLF) and beam failure recovery (BFR) procedure, or a capability to perform an ML-based RRM relaxation procedure.

Clause 15: The method of any of Clauses 1-14, wherein the at least one ML capability of the UE comprises at least one of: an ML training capability, an ML inference capability, a processing capability, one or more supported ML model formats, one or more supported ML libraries, or an indication of one or more locally cached ML models.

Clause 16: A method for wireless communication by a base station (BS) or other network entity, comprising: receiving, from a user equipment (UE), UE capability information indicating at least one radio capability of the UE and at least one machine learning (ML) capability of the UE; and transmitting, to the UE based on the UE capability information, ML configuration information indicating at least one neural network function (NNF) and at least one ML model corresponding to the at least one NNF.

Clause 17: The method of Clause 16, wherein in the ML configuration information: the at least one NNF is indicated by an NNF identifier (ID), and the at least one ML model is indicated by an ML model ID.

Clause 18: The method of any of Clauses 16-17, wherein: the at least one NNF comprises at least a portion of an ML-based wireless communications management procedure, and the ML model is configured to perform the at least the portion of the ML-based wireless communications management procedure.

Clause 19: The method of Clause 18, wherein the ML-based wireless communications management procedure comprises at least one of: a cell reselection procedure, an idle or inactive mode measurement procedure, a radio resource management (RRM) measurement procedure, a radio link monitoring (RLM) procedure, a channel state information (CSI) measurement procedure, a precoding matrix indicator (PMI), rank indicator (RI), and channel quality indicator (CQI) feedback procedure, a radio link failure (RLF) and beam failure recovery (BFR) procedure, or a power saving procedure.

Clause 20: The method of any of Clauses 18-19, further comprising: selecting the ML-based wireless communications management procedure to be used at the UE; determining the at least one NNF corresponding to the selected the ML-based wireless communications management procedure; and selecting the at least one ML model for performing the at least the portion of the ML-based wireless communications management procedure based, at least in part, on the at least one of the at least one radio capability of the UE or the at least one ML capability of the UE.

Clause 21: The method of Clause 20, further comprising establishing a context for the UE based, at least in part, on the at least one NNF, the at least one ML model, and the at least one ML capability of the UE.

Clause 22: The method of any of Clauses 18-21, wherein the at least one ML model for performing the at least the portion of the ML-based wireless communications management procedure comprises an ML model structure and one or more parameters associated with the ML model structure.

Clause 23: The method of Clause 22, wherein the one or more parameters comprise a set of weights, and the one or more parameters are indicated in the ML configuration information by a parameter set ID.

Clause 24: The method of Clause 22, further comprising transmitting at least one of the ML model structure or the one or more parameters associated with the ML model structure, to the UE.

Clause 25: The method of Clause 24, further comprising receiving, from the UE after transmitting the ML configuration information, a signal indicating that the at least one ML model is ready to be used.

Clause 26: The method of any of Clauses 18-25, further comprising transmitting, to the UE, a signal activating use of the at least one ML model to perform the at least the portion of the ML-based wireless communications management procedure.

Clause 27: The method of Clause 26, further comprising: activating use of a second ML model at the BS or other network entity; receiving a UE output of the at least one ML model from the UE; inputting the UE output to the second ML model at the BS or other network entity; and obtaining an output to the second ML model at the BS or other network entity.

Clause 28: The method of any of Clauses 26-27, wherein transmitting the signal activating the use of the at least one ML model comprises transmitting the signal activating the use of the at least one ML model in a media access control element (MAC-CE) or in radio resource control (RRC) signaling.

Clause 29: The method of any of Clauses 16-28, wherein receiving the UE capability information comprises receiving the UE capability information in a radio resource control (RRC) connection setup message.

Clause 30: The method of any of Clauses 16-29, wherein transmitting the ML configuration information comprises transmitting the ML configuration information in a radio resource control (RRC) reconfiguration message.

Clause 31: The method of any of Clauses 16-30, wherein the at least one radio capability of the UE comprises at least one of: a capability to perform an ML-based cell reselection procedure, a capability to perform an ML-based idle or inactive mode measurement procedure, a capability to perform an ML-based radio resource management (RRM) measurement procedure, a capability to perform an ML-based radio link monitoring (RLM) procedure, a capability to perform an ML-based channel state information (CSI) measurement procedure, a capability to perform an ML-based precoding matrix indicator (PMI), rank indicator (RI), and channel quality indicator (CQI) feedback procedure, a capability to perform an ML-based radio link failure (RLF) and beam failure recovery (BFR) procedure, or a capability to perform an ML-based RRM relaxation procedure.

Clause 32: The method of any of Clauses 16-31, wherein the at least one ML capability of the UE comprises at least one of: an ML training capability, an ML inference capability, a processing capability, one or more supported ML model formats, one or more supported ML libraries, or an indication of one or more locally cached ML models.

Clause 33: A method for wireless communication by a first network entity, comprising: receiving, from a second network entity, a first signal including a first indication of at least one machine learning (ML) capability of a user equipment (UE) and a second indication of at least one neural network function (NNF) corresponding to an ML-based wireless communications management procedure associated with the UE; selecting at least one ML model for performing at least a portion of the ML-based wireless communications management procedure based, at least in part, on the at least one ML capability of the UE; and transmitting a second signal, to the second network entity, including ML configuration information indicating the at least one NNF and the at least one ML model.

Clause 34: The method of Clause 33, wherein in the ML configuration information: the at least one NNF is indicated by an NNF identifier (ID), and the at least one ML model is indicated by an ML model ID.

Clause 35: The method of any of Clauses 33-34, wherein the at least one ML model comprises an ML model structure and one or more sets of parameters associated with the ML model structure.

Clause 36: The method of Clause 35, further comprising determining the ML model structure and the one or more sets of parameters associated with the ML model structure.

Clause 37: The method of any of Clauses 35-36, wherein: the one or more sets of parameters comprise at least a set of weights, and the one or more parameters are indicated in the ML configuration information by a parameter set ID.

Clause 38: The method of any of Clauses 33-37, further comprising transmitting a third signal, to a third network entity, including an indication of the at least one NNF and a second ML model corresponding to the at least one NNF for performing at least another portion of the ML-based wireless communications management procedure.

Clause 39: The method of Clause 38, wherein: the first network entity comprises a centralized unit machine learning plane (CU-MLP) entity, the second network entity comprises a centralized unit control plane (CU-CP) entity, and the third network entity comprises a distributed unit (DU) entity.

Clause 40: The method of Clause 39, wherein the CU-CP entity is a part of a base station, and the CU-MLP entity at least a portion of an entity separate from the base station.

Clause 41: The method of any of Clauses 33-39, further comprising receiving a third signal, forwarded by the second network entity from the UE, indicating that the at least one ML model is ready to be used.

Clause 42: The method of any of Clauses 33-41, further comprising establishing a context for the UE for the at least one NNF.

Clause 43: The method of Clause 42, wherein the first signal comprises a context setup request message and the second signal comprises a context setup response message.

Clause 44: The method of any of Clauses 33-43, wherein the at least one ML capability of the UE comprises at least one of: an ML training capability, an ML inference capability, a processing capability, one or more supported ML model formats, one or more supported ML libraries, or an indication of one or more locally cached ML models.

Clause 45: The method of any of Clauses 33-44, further comprising transmitting, to the UE, a third signal activating use of the at least one ML model to perform the at least the portion of the ML-based wireless communications management procedure.

Clause 46: The method of Clause 45, wherein transmitting the third signal activating the use of the at least one ML model comprises transmitting the third signal activating the use of the at least one ML model in a media access control element (MAC-CE) or in radio resource control (RRC) signaling.

Clause 47: An apparatus, comprising: a memory comprising executable instructions; one or more processors configured to execute the executable instructions and cause the apparatus to perform a method in accordance with any of Clauses 1-46.

Clause 48: An apparatus, comprising means for performing a method in accordance with any of Clauses 1-46.

Clause 49: A non-transitory computer-readable medium comprising executable instructions that, when executed by one or more processors of an apparatus, cause the apparatus to perform a method in accordance with any of Clauses 1-46.

Clause 50: A computer program product embodied on a computer-readable storage medium comprising code for performing a method in accordance with any of Clauses 1-46.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability specifications.

Returning to FIG. 1, various aspects of the present disclosure may be performed within the example wireless communications network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as a gNB may operate in a traditional sub-6 GHz spectrum, in millimeter wave (mmWave) frequencies, and/or near mmWave frequencies in communication with the UE 104. When the gNB operates in mmWave or near mmWave frequencies, the gNB may be referred to as a mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152 and AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS bearer services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management function (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communications network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communications network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of configuring and using ML models for performing one or more NNFs, such as ML-based wireless communications management procedures in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein and are intended to be encompassed by the claims. Moreover, nothing disclosed herein is intended to be dedicated to the public regardless of whether such disclosure is explicitly recited in the claims.

What is claimed is:

1. An apparatus for wireless communication by a user equipment (UE), comprising:
    one or more memories comprising executable instructions; and
    one or more processors configured to execute the executable instructions and cause the UE to:
        transmit, to a network entity, UE capability information indicating at least one radio capability of the UE and at least one machine learning (ML) capability of the UE; and
        receive, from the network entity based on the UE capability information, ML configuration information indicating:
            at least one neural network function (NNF) comprising at least one ML-based wireless communications management procedure; and
            at least one ML model configured for performing the at least one ML-based wireless communications management procedure, wherein:
                the at least one ML-based wireless communications management procedure comprises a channel state information (CSI) procedure; and
                the at least one ML model comprises, at least, an ML model for performing CSI compression for the CSI procedure.

2. The apparatus of claim 1, wherein in the ML configuration information:
    the at least one NNF is indicated by an NNF identifier (ID), and
    the at least one ML model is indicated by an ML model ID.

3. The apparatus of claim 1, wherein the ML-based wireless communications management procedure further comprises at least one of:
    a cell reselection procedure,
    an idle or inactive mode measurement procedure,
    a radio resource management (RRM) measurement procedure,
    a radio link monitoring (RLM) procedure,
    a precoding matrix indicator (PMI), rank indicator (RI), and channel quality indicator (CQI) feedback procedure,
    a radio link failure (RLF) and beam failure recovery (BFR) procedure, or
    a power saving procedure.

4. The apparatus of claim 1, wherein the at least one ML model for performing the ML-based wireless communications management procedure comprises an ML model structure and one or more sets of parameters associated with the ML model structure.

5. The apparatus of claim 4, wherein:
    the one or more sets of parameters comprise at least a set of weights, and
    the one or more sets of parameters are indicated in the ML configuration information by a parameter set ID.

6. The apparatus of claim 4, wherein the one or more processors are further configured to cause the UE to receive at least one of the ML model structure or the one or more sets of parameters associated with the ML model structure, from the network entity.

7. The apparatus of claim 6, wherein the one or more processors are further configured to cause the UE to transmit, to the network entity after receiving the at least one of the ML model structure or the one or more sets of parameters, a signal indicating that the at least one ML model is ready to be used.

8. The apparatus of claim 1, wherein the one or more processors are further configured to cause the UE to receive, from the network entity, an activation signal activating use of the at least one ML model to perform the ML-based wireless communications management procedure.

9. The apparatus of claim 8, wherein the one or more processors are further configured to cause the UE to perform the ML-based wireless communications management procedure using the at least one ML model based on the activation signal, wherein, in order to perform the ML-based wireless communications management procedure, the one or more processors are further configured to cause the UE to:
    input one or more input variables to the at least one ML model; and
    obtain an output from the at least one ML model based on the one or more input variables.

10. The apparatus of claim 8, wherein the one or more processors are further configured to cause the UE to receive the activation signal in a media access control control element (MAC-CE) or in radio resource control (RRC) signaling.

11. The apparatus of claim 1, wherein the one or more processors are further configured to cause the UE to transmit the UE capability information during a radio resource control (RRC) connection setup procedure.

12. The apparatus of claim 1, wherein the one or more processors are further configured to cause the UE to receive the ML configuration information comprises receiving the ML configuration information in a radio resource control (RRC) reconfiguration message.

13. The apparatus of claim 1, wherein the at least one radio capability of the UE comprises at least one of:
    a capability to perform an ML-based cell reselection procedure,
    a capability to perform an ML-based idle or inactive mode measurement procedure,
    a capability to perform an ML-based radio resource management (RRM) measurement procedure,
    a capability to perform an ML-based radio link monitoring (RLM) procedure,
    a capability to perform an ML-based channel state information (CSI) measurement procedure,
    a capability to perform an ML-based precoding matrix indicator (PMI), rank indicator (RI), and channel quality indicator (CQI) feedback procedure,
    a capability to perform an ML-based radio link failure (RLF) and beam failure recovery (BFR) procedure, or
    a capability to perform an ML-based RRM relaxation procedure.

14. The apparatus of claim 1, wherein the at least one ML capability of the UE comprises at least one of:
    an ML training capability,
    an ML inference capability,
    a processing capability,
    one or more supported ML model formats,
    one or more supported ML libraries, or
    an indication of one or more locally cached ML models.

15. An apparatus for wireless communication a network entity, comprising:
    one or more memories comprising executable instructions; and
    one or more processors configured to execute the executable instructions and cause the network entity to:
        receive, from a user equipment (UE), UE capability information indicating at least one radio capability of the UE and at least one machine learning (ML) capability of the UE; and
        transmit, to the UE based on the UE capability information, ML configuration information indicating:
            at least one neural network function (NNF) comprising at least one ML-based wireless communications management procedure; and
            at least one ML model configured for performing the at least one ML-based wireless communications management procedure, wherein:
            the at least one ML-based wireless communications management procedure comprises a channel state information (CSI) procedure; and
            the at least one ML model comprises, at least, an ML model for performing CSI compression for the CSI procedure.

16. The apparatus of claim 15, wherein in the ML configuration information:
    the at least one NNF is indicated by an NNF identifier (ID), and
    the at least one ML model is indicated by an ML model ID.

17. The apparatus of claim 15, wherein the ML-based wireless communications management procedure further comprises at least one of:
    a cell reselection procedure,
    an idle or inactive mode measurement procedure,
    a radio resource management (RRM) measurement procedure,
    a radio link monitoring (RLM) procedure,
    a channel state information (CSI) measurement procedure,
    a precoding matrix indicator (PMI), rank indicator (RI), and channel quality indicator (CQI) feedback procedure,
    a radio link failure (RLF) and beam failure recovery (BFR) procedure, or
    a power saving procedure.

18. The apparatus of claim 15, wherein the one or more processors are further configured to cause the network entity to:
    select the ML-based wireless communications management procedure to be used at the UE;
    determine the at least one NNF corresponding to the selected the ML-based wireless communications management procedure; and
    select the at least one ML model for performing the ML-based wireless communications management procedure based, at least in part, on at least one of the at least one radio capability of the UE or the at least one ML capability of the UE.

19. The apparatus of claim 18, wherein the one or more processors are further configured to cause the network entity to establish a context for the UE based, at least in part, on the at least one NNF, the at least one ML model, and the at least one ML capability of the UE.

20. The apparatus of claim 15, wherein:
    the at least one ML model for performing the ML-based wireless communications management procedure comprises an ML model structure and one or more sets of parameters associated with the ML model structure,
    the one or more sets of parameters comprise a set of weights, and
    the one or more sets of parameters are indicated in the ML configuration information by a parameter set ID.

21. The apparatus of claim 20, wherein the one or more processors are further configured to cause the network entity to:
    transmit at least one of the ML model structure or the one or more sets of parameters associated with the ML model structure, to the UE; and
    receive, from the UE after transmitting the ML configuration information, a signal indicating that the at least one ML model is ready to be used.

22. The apparatus of claim 15, wherein the one or more processors are further configured to cause the network entity to transmit, to the UE in a media access control control element (MAC-CE) or in radio resource control (RRC) signaling, an activation signal activating use of the at least one ML model to perform the ML-based wireless communications management procedure.

23. The apparatus of claim 22, wherein the one or more processors are further configured to cause the network entity to:
    activate use of a second ML model at the network entity;
    receive a UE output of the at least one ML model from the UE;

input the UE output to the second ML model at the network entity; and
obtain an output to the second ML model at the network entity.

24. The apparatus of claim 15, wherein:
the one or more processors are further configured to cause the network entity to receive the UE capability information comprises in a radio resource control (RRC) connection setup message, and
the one or more processors are further configured to cause the network entity to transmit the ML configuration information in a radio resource control (RRC) reconfiguration message.

25. The apparatus of claim 15, wherein the at least one radio capability of the UE comprises at least one of:
a capability to perform an ML-based cell reselection procedure,
a capability to perform an ML-based idle or inactive mode measurement procedure,
a capability to perform an ML-based radio resource management (RRM) measurement procedure,
a capability to perform an ML-based radio link monitoring (RLM) procedure,
a capability to perform an ML-based channel state information (CSI) measurement procedure,
a capability to perform an ML-based precoding matrix indicator (PMI), rank indicator (RI), and channel quality indicator (CQI) feedback procedure,
a capability to perform an ML-based radio link failure (RLF) and beam failure recovery (BFR) procedure, or
a capability to perform an ML-based RRM relaxation procedure.

26. The apparatus of claim 15, wherein the at least one ML capability of the UE comprises at least one of:
an ML training capability,
an ML inference capability,
a processing capability,
one or more supported ML model formats,
one or more supported ML libraries, or
an indication of one or more locally cached ML models.

27. A method for wireless communication by a user equipment (UE), comprising:
transmitting, to a network entity, capability information indicating at least one radio capability of the UE and at least one machine learning (ML) capability of the UE; and
receiving, from the network entity based on the capability information, ML configuration information indicating:
at least one neural network function (NNF) comprising at least one ML-based wireless communications management procedure; and
at least one ML model configured for performing the at least one ML-based wireless communications management procedure, wherein:
the at least one ML-based wireless communications management procedure comprises a channel state information (CSI) procedure; and
the at least one ML model comprises, at least, an ML model for performing CSI compression for the CSI procedure.

28. A non-transitory computer-readable medium for wireless communication, comprising executable instructions that, when executed by one or more processors of an apparatus, cause the apparatus to:
transmit, to a network entity, capability information indicating at least one radio capability of the apparatus and at least one machine learning (ML) capability of the apparatus; and
receive, from the network entity based on the capability information, ML configuration information indicating:
at least one neural network function (NNF) comprising at least one ML-based wireless communications management procedure; and
at least one ML model configured for performing the at least one ML-based wireless communications management procedure, wherein:
the at least one ML-based wireless communications management procedure comprises a channel state information (CSI) procedure; and
the at least one ML model comprises, at least, an ML model for performing CSI compression for the CSI procedure.

29. A method for wireless communication by a network entity, comprising:
receiving, from a user equipment (UE), UE capability information indicating at least one radio capability of the UE and at least one machine learning (ML) capability of the UE; and
transmitting, to the UE based on the UE capability information, ML configuration information indicating:
at least one neural network function (NNF) comprising at least one ML-based wireless communications management procedure; and
at least one ML model configured for performing the at least one ML-based wireless communications management procedure, wherein:
the at least one ML-based wireless communications management procedure comprises a channel state information (CSI) procedure; and
the at least one ML model comprises, at least, an ML model for performing CSI compression for the CSI procedure.

\* \* \* \* \*